US008116913B2

(12) United States Patent
Mirpourian et al.

(10) Patent No.: US 8,116,913 B2
(45) Date of Patent: Feb. 14, 2012

(54) HEATING AND COOLING SYSTEM USING COMPRESSED FLUID

(75) Inventors: Seyed Hadi Mirpourian, Hillsboro, OR (US); Peter James Gall, Tualatin, OR (US)

(73) Assignee: Air Energy Solutions, Inc., Hillsboro, OR (US)

( * ) Notice: Subject to any disclaimer, the term of this patent is extended or adjusted under 35 U.S.C. 154(b) by 362 days.

(21) Appl. No.: 12/426,922

(22) Filed: Apr. 20, 2009

(65) Prior Publication Data

US 2010/0070090 A1   Mar. 18, 2010

Related U.S. Application Data

(60) Provisional application No. 61/192,148, filed on Sep. 16, 2008, provisional application No. 61/156,001, filed on Feb. 27, 2009.

(51) Int. Cl.
G06F 19/00 (2011.01)
(52) U.S. Cl. ........................................ 700/278; 236/49.3
(58) Field of Classification Search .................. 700/278; 236/49.3, 46 R; 62/5
See application file for complete search history.

(56) References Cited

U.S. PATENT DOCUMENTS

| 1,952,281 | A |   | 3/1934  | Ranque |        |
|-----------|---|---|---------|--------|--------|
| 3,026,681 | A |   | 3/1962  | Green  |        |
| 3,898,978 | A |   | 8/1975  | Marcus |        |
| 3,922,871 | A |   | 12/1975 | Bolesta |       |
| 4,060,123 | A | * | 11/1977 | Hoffman et al. | 165/11.1 |
| 4,184,634 | A | * | 1/1980  | Betts et al. | 236/13 |
| 4,302,949 | A |   | 12/1981 | Trimboli Longhetto | |
| 4,308,993 | A |   | 1/1982  | Buss   |        |
| 4,333,017 | A |   | 6/1982  | O'Connell |     |
| 4,505,426 | A | * | 3/1985  | Rossi et al. | 236/47 |
| 4,585,162 | A | * | 4/1986  | Evans  | 236/47 |
| 4,646,524 | A |   | 3/1987  | Kawashima et al. | |
| 4,848,654 | A | * | 7/1989  | Zelczer et al. | 236/49.4 |
| 5,129,578 | A |   | 7/1992  | Kokubo |        |
| 5,331,817 | A |   | 7/1994  | Anthony |       |

(Continued)

FOREIGN PATENT DOCUMENTS

WO   96/35085 A1   11/1996

(Continued)

OTHER PUBLICATIONS

International Search Report and Written Opinion in International Application Serial No. PCT/US2009/057135, mailed Nov. 20, 2009.

*Primary Examiner* — Kidest Bahta
(74) *Attorney, Agent, or Firm* — Nixon Peabody LLP; Joseph Bach, Esq.

(57) ABSTRACT

Use of compressed air for indoor ambient temperature conditioning. Thermal energy is imparted to or extracted from compressed air, and the compressed air is released inside a structure enclosing a space. The compressed air may be used as a direct heat conduction/extraction medium. A flow of external air is created over a heat exchanger mass, so that thermal energy of the compressed air flowing inside the heat exchanger mass is transferred to the external flow of air flowing outside the heat exchanger mass. In addition to being a direct heat conduction/extraction medium, the compressed air is used as heat transfer medium, that ultimately gets mixed with the flow of external air. Fresh external air may be used. A local feedback loop may be used to route back a portion of temperature-conditioned air to regulate a flow of external air over a heat exchanger mass.

36 Claims, 19 Drawing Sheets

U.S. PATENT DOCUMENTS

| | | | |
|---|---|---|---|
| 5,720,179 A * | 2/1998 | Jung | 62/160 |
| 5,742,956 A * | 4/1998 | Tarver | 4/663 |
| 5,911,740 A | 6/1999 | Tunkel et al. | |
| 6,082,116 A | 7/2000 | Tunkel et al. | |
| 6,401,463 B1 | 6/2002 | Dukhan et al. | |
| 7,775,448 B2 * | 8/2010 | Votaw et al. | 236/1 B |
| 2004/0238653 A1 * | 12/2004 | Alles | 236/49.3 |
| 2005/0156054 A1 * | 7/2005 | Shah | 236/49.3 |
| 2008/0011864 A1 | 1/2008 | Tessier et al. | |

FOREIGN PATENT DOCUMENTS

| | | |
|---|---|---|
| WO | 2008/049054 A1 | 4/2008 |

\* cited by examiner

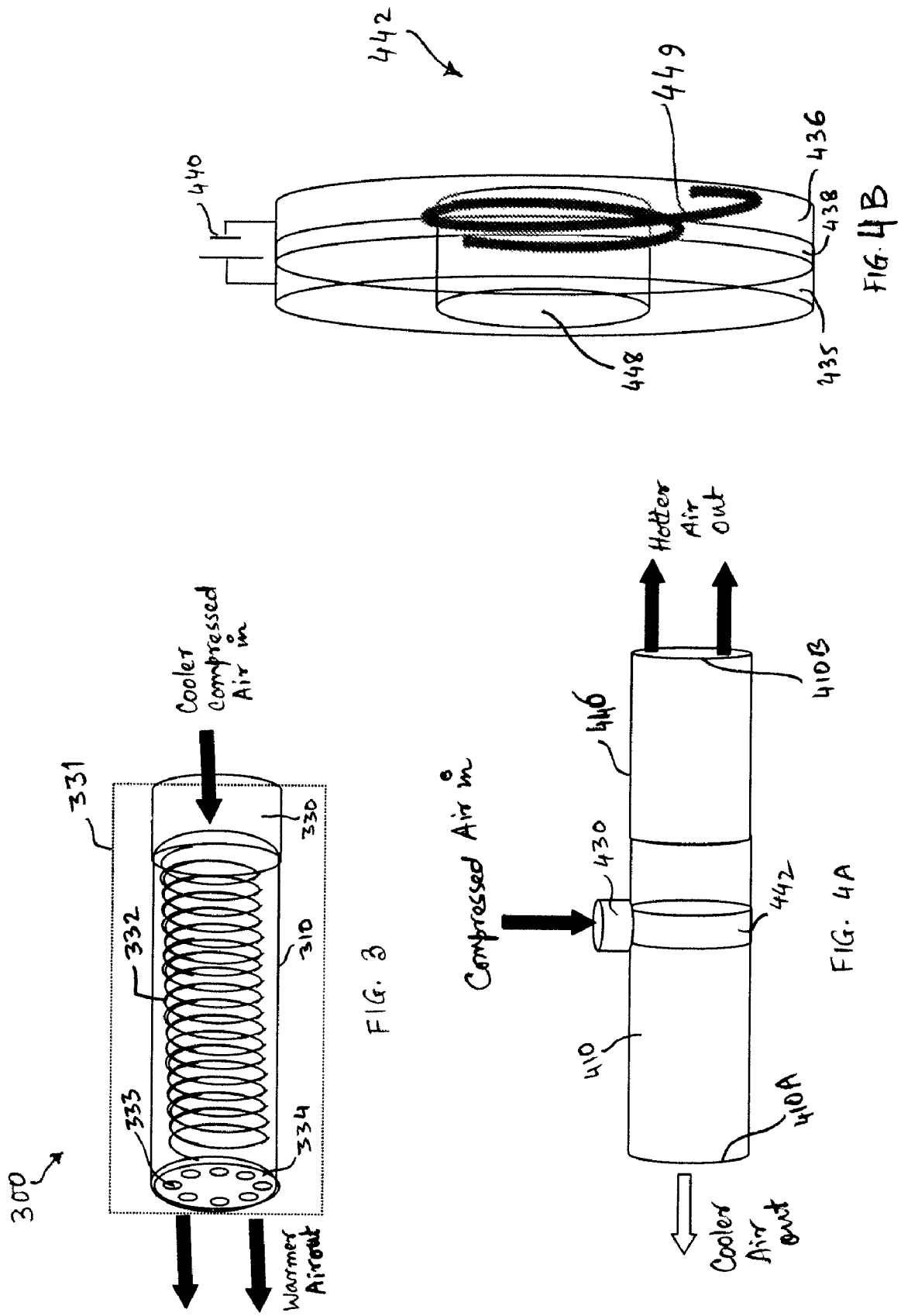

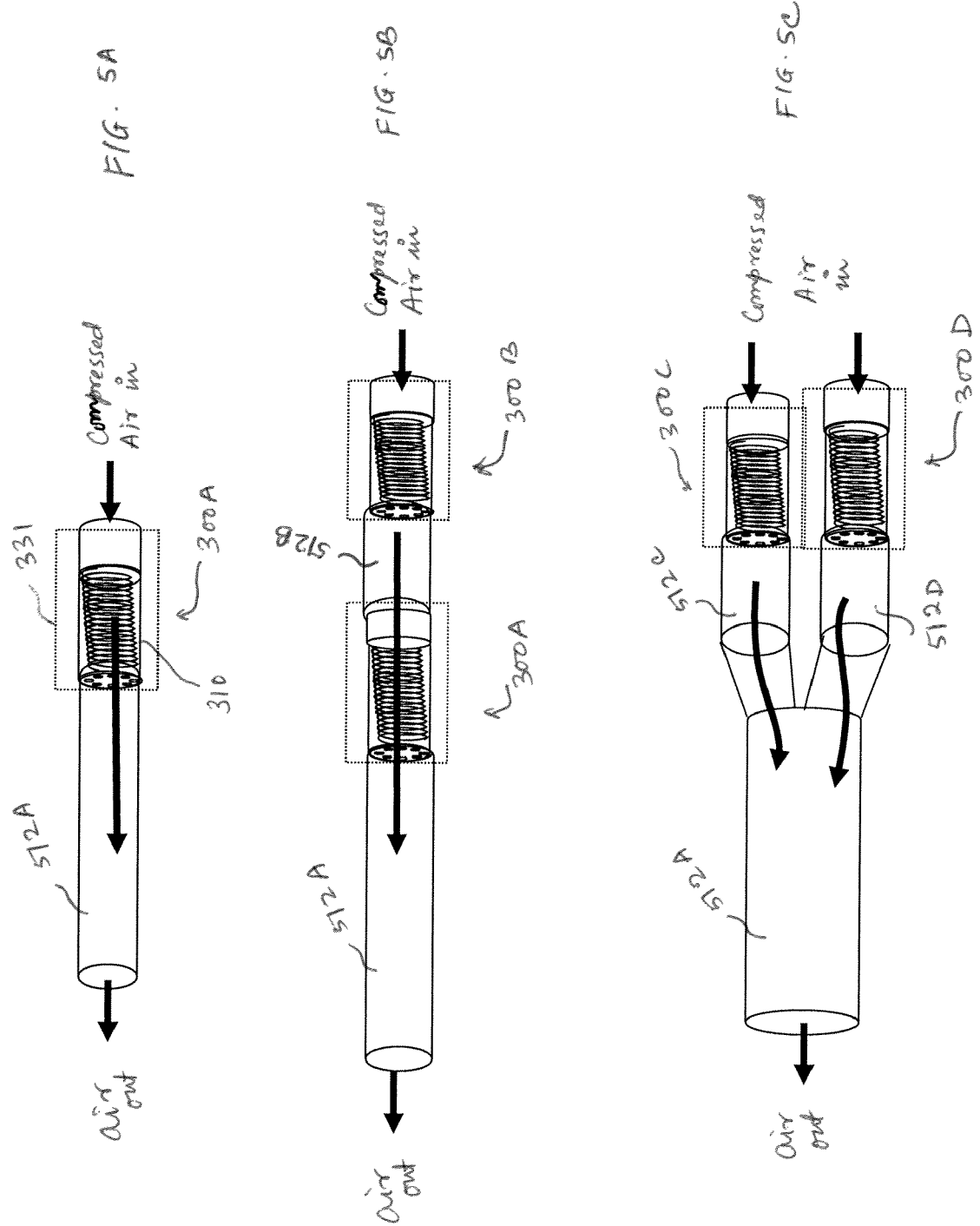

HEATING AND COOLING SYSTEM USING COMPRESSED FLUID

CROSS REFERENCE TO RELATED APPLICATIONS

This application claims the benefit of U.S. Provisional Application No. 61/192,148, filed Sep. 16, 2008, entitled "Compressed Air HVAC System," and U.S. Provisional Application No. 61/156,001, filed Feb. 27, 2009, entitled "Compressed Air Heating and Cooling System," both of which in their entirety are hereby incorporated by reference.

BACKGROUND

1. Field of the Invention

This invention relates generally to systems and methods for conditioning temperature of an enclosed space using a compressed fluid as a thermal energy transport and/or transfer medium.

2. Related Arts

In a conventional system for indoor climate control, such as, a Heating, Ventilating and Air Conditioning (HVAC) system, or a heat pump system, a network of air ducts are built into the walls/ceiling/floor of a building to circulate and/or re-circulate air inside the building. The network of air ducts is coupled to a furnace and/or a heat extraction unit, which actively adds or removes thermal energy of the air, depending on a target ambient temperature that needs to be achieved inside the building. The addition or removal of thermal energy to or from the air may take place in one of the following ways: 1) directly heating or cooling a flow of air that gets released inside the building; and, 2) heating or cooling a heat transfer fluid, and enabling thermal energy exchange between the flow of air and the heat transfer fluid. A combination of the above two methods is used too to increase the overall efficiency of the system. Conventionally, the flow of air that is circulated in the air ducts is at atmospheric pressure. If a heat transfer fluid is used, the flow of the heat transfer fluid is conventionally kept in a closed loop separate from the flow of air in the air duct, i.e. the heat transfer fluid does not get released inside the building.

Commonly used heat transfer fluids, such as, Freon, are not considered "green" or environmentally friendly. Though the heat transfer fluid does not get released inside the building, procurement and disposal of a non-green fluid adds to the carbon footprint of a system. Also, some amount of heat-transfer fluid may leak out from a closed loop to get mixed with the main air flow. If direct heating or cooling of a flow of air is adopted to avoid the use of a heat transfer fluid, then a relatively longer time and larger consumption of energy may be needed to achieve a target temperature.

Conventional systems for indoor climate control consume fossil fuel (for active heating) and/or electricity (both for active heating and cooling). Burning fossil fuel in a furnace directly produces air-polluting gases and residues locally, which need to be removed from the system. This adds to the operational cost and infrastructural requirements of the system. Electric-only heating and/or cooling systems do not rely on fossil fuels, but usually consume a large amount of electricity to generate or extract thermal energy, resulting in a high operational cost. The total carbon footprint of electric-only heating/cooling may be quite high, as most of the electric power plants still use fossil fuel to generate electricity.

What is needed is an efficient system for heating and cooling which is environmentally friendly, and consumes less electricity to achieve the same degree of temperature conditioning.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the present invention use compressed air for indoor ambient temperature conditioning. Thermal energy is imparted to or extracted from a quantity of compressed air, and the compressed air is then directed to be released inside a structure enclosing a space, whose ambient temperature needs to be controlled. Thus, the compressed air is being used as a direct heat conduction/extraction medium.

According to one example, a flow of air is created over a heat exchanger mass (a "heating mass" or a "cooling mass"), so that thermal energy of the compressed air flowing inside the heat exchanger mass is transferred to the flow of air flowing outside the heat exchanger mass. Thus, in addition to being a direct heat conduction/extraction medium, the compressed air is being used as a heat transfer medium, that ultimately gets mixed with the flow of air flowing outside the heat exchanger mass.

In an example embodiment, a fresh supply of external air is used to flow over the heat exchanger mass rather than using re-circulated air, in order to maintain a high quality of breathable air. In another example embodiment, recirculated air from inside a structure is made to flow over the heat exchanger mass.

In some embodiments, a local feedback loop is used to route back a portion of temperature-conditioned air produced by a system according to the present invention, to regulate a flow of air over a heat exchanger mass. The flow of air over the heat exchanger mass is also controlled by monitoring a temperature of the heat exchanger mass using temperature sensors.

Embodiments of the present invention can be retrofitted to an existing climate control systems or appliances using existing air ducts and/or existing thermal exchange devices. Alternatively, embodiments of the present invention can be installed as a standalone system in a building or an appliance.

Using compressed air as a heat transport/transfer medium, and employing appropriate thermal design, embodiments of the present invention provide a temperature control mechanism that is both environment-friendly and energy-efficient. Embodiments of the present invention may use compressed air or other environmentally benign compressible fluids as a heat transport/transfer medium.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 3 illustrates an example heat tube for heating up compressed fluid flowing inside the tube.

FIG. 4A illustrates an example vortex tube with a thermoelectric washer, according to an embodiment of the present invention.

FIG. 4B illustrates details of the thermoelectric washer used in the vortex tube of FIG. 4A.

FIG. 5A-C illustrate various configurations of heat tubes and heating masses, according to embodiments of the present invention.

DETAILED DESCRIPTION

Overview

Aspects of the present invention utilize using environmentally friendly compressed fluid, such as, compressed air, as a medium for thermal energy transport/transfer. Because the embodiments of the invention are fueled by air rather than conventionally used mediums, such as, natural gas or Freon, this invention provides a "green" energy system with no direct carbon emission. The technology described herein is environmentally responsible, energy-efficient, and generally safer than existing HVAC technology. Certain embodiments of the present invention are used as a furnace, wherein there is no risk of combustion or pollution from gas leaks, because the embodiments rely solely on air and electricity.

An embodiment of the inventive system has the potential to improve indoor air quality, because, unlike standard gas furnaces, "old" or used air may not be continuously re-circulated. Rather, the system effectively allows "new" clean air to be continuously added into a structure, reducing allergens and stagnant air.

This technology can be used in numerous "green" heating and cooling applications, simply by retrofitting a system to existing climate control systems, installing a new system, or even using the technology in new consumer and industrial products.

Compressed air can be used as an environment-friendly clean medium for thermal energy transport and/or transfer for temperature conditioning applications. It has been shown that heating up or cooling down a certain quantity of compressed air takes lower energy and/or time than heating up/cooling down the same quantity of uncompressed air at atmospheric pressure. Without being bound by theory, this may be because the molecules of a compressed fluid are closer to each other than they are in uncompressed fluid, resulting in a quick build-up or loss of thermal energy. Also, reduction in volume in a compressed fluid results in a greater mass flow rate for a constant volume flow rate. Thus, more thermal energy can be transported or transferred per unit time when compressed fluid is used rather than uncompressed fluid. It is to be noted that though embodiments of the present invention use compressed air for indoor temperature control applications, the scope of the invention is not limited to the use of compressed air. Other type of compressible fluid (gas or liquid) may be used depending on the end application. In the example embodiments discussed below, a pressure range of 20-80 PSI is used as the compressed air pressure, though other pressure values are within the scope of the invention. The upper limit of compressed air pressure may be limited by electrical energy required to compress the air, and/or a noise generated by an air compressor.

Components of a System

Figure 1:
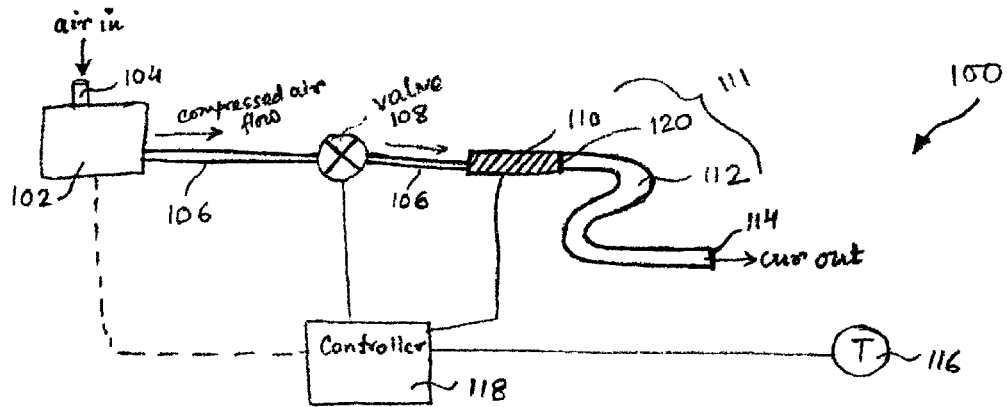
FIG. 1 illustrates the basic components of a single-stage air temperature conditioning system, according to an embodiment of the present invention.

FIG. 1 shows a system 100, according to an embodiment of the present invention, illustrating some of the basic components for the implementation of the invention. System 100 is used to condition the indoor ambient temperature of an enclosed space inside a structure. The structure can be a variety of facilities, including, but not limited to, a residential house, a room, an apartment, a commercial building, an office space, a factory, a warehouse, an indoor recreational area, a store, a shopping mall, a restaurant, a spa, a gymnasium, an indoor sports facility, a computer data center, a hotel, a hospital etc. System 100 may be a portable unit, a fixed dedicated unit for local or zonal temperature conditioning, or a central unit for overall indoor temperature conditioning of a facility. Moreover, a structure can be an appliance (e.g., an oven, a washer, a refrigerator, a portable cooler box etc.) or a mobile entity (e.g., an automobile, a train compartment etc.) whose inside temperature needs to be controlled.

System 100 includes a source 102 of compressed air, a conduit 106 for carrying the compressed air, a valve 108 for regulating a flow of the compressed air, an energy control means 110 for actively controlling thermal energy of the compressed air, a heat exchanger mass 112 for tuning a final temperature of the air flow, and an outlet port 114 for releasing a temperature-conditioned air flow inside a structure (not shown) whose inside ambient temperature needs to be controlled. A temperature monitoring device 116 (such as, a thermostat) measures a current temperature of the enclosed space inside the structure, compares the current temperature with a desired temperature, and sends a signal to an electronic controller 118 whether the enclosed space needs to be heated or cooled further, or whether the current operation of heating or cooling needs to be stopped. Persons skilled in the art will appreciate that a variety of sensors (e.g., a compressed air flow sensor, a pressure sensor, a heat sensor, a cold sensor etc.) may be included in system 100 to enable the electronic controller 118 to control overall operation of the system. Those sensors are not shown in FIG. 1 for clarity. However, some of the sensors and their operations will be discussed later with respect to subsequent figures (e.g., FIGS. 8-10 and FIGS. 14A-G). Also, it is to be understood that air is kept at higher pressure till an interface 120 between the thermal energy controlling means 110, and heat exchanger mass 112. Heat exchanger mass 112 may be a heating mass or a cooling mass, depending on the application. After the interface 120, air pressure comes down to normal atmospheric pressure within the heat exchanger mass 112, as the outlet port 114 is exposed to normal atmospheric pressure. In a system where heat exchanger mass 112 is not present, compressed air may be directly released to the enclosed space without further temperature tuning. Thermal energy controlling means 110 and heat exchanger mass 112 together may constitute a temperature conditioning device 111 that determines the final temperature of air coming out from outlet port 114.

Source 102 may be a compressor, or a high-pressure blower, and source 102 may or may not include a local storage tank (not shown separately) of compressed air. Air is supplied to the source 102 through an inlet port 104. Inlet port 104 may be a conduit to bring in fresh air from outside the structure, or to bring in re-circulated air from inside the structure, or both. Valve 108 may be a solenoid valve or a check valve or any other type of fluid flow control valve installed along conduit 106 carrying compressed air. Valve 108 is controlled by the electronic controller 118 to deliver a continuous flow of compressed air, or a pulsed or oscillatory flow of compressed air. Electronic controller 118 may optionally control generation of compressed air at the source 102, as required, i.e. compressed air is generated based on demand. Typically, continuous flow is used with relatively lower pressure compressors, while pulse or oscillatory flow is used for relatively higher pressure compressors. Usually, pulsed or oscillatory flows require a higher quantity of compressed air compared to the quantity of air required in a continuous flow. As time spent inside the thermal energy controlling means 110 and heat exchanger mass 112 is greater in pulsed or oscillatory flow compared to a continuous flow, the heat transfer process is more efficient.

Means 110 is used for actively controlling the thermal energy of the compressed air. Thermal energy controlling means 110 may include heating only means, cooling only means, or a combination of heating and cooling means. For example, heating only means may include one or more heat tubes. A heat tube is a structure that actively heats up the compressed fluid inside. An exemplary heat tube assembly 300 is shown in FIG. 3.

Heat tube assembly 300 has an embedded electric heater 332 coupled to a heat tube 310 to heat up the compressed air inside. Cooler compressed air enters the heat tube 310 through inlet port 330. Heat tube 310 is configured to sustain raised pressure of a compressed fluid. Heat tube 310 is fitted with a pressure plate 334, which prevents pressure loss of the compressed air. Heated compressed air comes out from the peripheral holes 333 of the pressure plate 334. In one embodiment, heat tube 310 may be made of stainless steel, and the embedded electric heater may be a heating coil 332 inside the stainless steel tube. A source of electricity supplies electric current to the heater 332, as dictated by controller 118. Heat tube assembly 300 may have a thermally insulating shield 331 around it to prevent heat loss.

In another embodiment of system 100, heating means 110 may comprise one or more hot vortex tubes, whose output is a stream of hot air. Similarly, cooling means 110 may include one or more cold vortex tubes, whose output is a stream of cold air. Note that a vortex tube produces both a hot air stream and a cold air stream simultaneously due to a "solid body rotation" of a tangentially-fed compressed air stream in a swirl chamber created inside the vortex tube. However only one of the air streams may be chosen as the output to be utilized depending on the end application. The other air stream may or may not be utilized further, and a proper exhaust may be required for the non-utilized stream of air.

FIG. 4A shows an example cold vortex tube 410 where an air stream is actively cooled using thermoelectric means. Thermoelectric means can be used for active heating also. Note that regular vortex tubes without the thermoelectric means may be used too, but the cooling/heating effect is enhanced by the action of the thermoelectric means. In the cold vortex tube shown in FIG. 4A, warmer compressed air is fed through inlet port 430 into a thermoelectric washer 442. Details of the thermoelectric washer 442 are shown in the exploded view of FIG. 4B. Thermoelectric washer 442 comprises two annular discs 435 and 436 of thermoelectric material separated by an annular dielectric disc 438. All three discs 435, 436 and 438 surround a central cold air aperture 448. A potential difference and proper polarity is maintained by a voltage source 440 coupled between the two discs 435 and 436 to generate a thermoelectric cooling effect. The swirling air flow 449 created in the vortex tube enters the cold air aperture 448 through a hole in the wall of the aperture 448, and the cooling effect of the vortex tube is magnified due to active thermoelectric cooling inside the cold air aperture 448.

FIG. 4A also shows that a cooler air flow comes out from a cold end 410A of vortex tube 410, and a hotter air flow (relatively hotter than the input compressed air) comes out from a hot end 410B of vortex tube 410. As mentioned before, proper exhaust of unutilized hotter air may be required. For this purpose, an exhaust structure 446 with a silencer (not shown specifically) may be coupled to the hot end 410B of the cold vortex tube 410. The silencer helps in reducing noise generated by the compressed air flow.

Referring back to FIG. 1, heat exchanger mass 112 is typically a thermally conductive tube of certain dimension and spatial arrangement that facilitates temperature tuning of heated/cooled air flowing inside the tube, as well as any air that is flowing over the tube. For example, after the heat exchanger mass 112 reaches a certain temperature, a fan/blower may blow a stream of air over the heat exchanger mass 112. Thermal energy is exchanged between the air flowing inside the tube and the air flowing over the tube. Heat exchanger mass 112 is designed to have enough surface area to facilitate this thermal exchange. Total mass and spatial arrangement of the heat exchanger mass may be varied depending on the desired end temperature, because the temperature of the air inside the heat exchanger mass changes due to radiative, conductive, and convective heat transfer (and heat transfer to external air if external air is flowing over the heat exchanger mass) as it flows inside the heat exchanger mass. For example, if the temperature at the inlet of the heat exchanger mass (at the interface 120 with a heat tube) is too high for an intended application, it may be brought down to a reasonable value by designing the heat exchanger mass properly. Note that, the term "heat exchanger mass" encompasses different types of heat exchangers including vortex heat exchangers.

Figure 2:
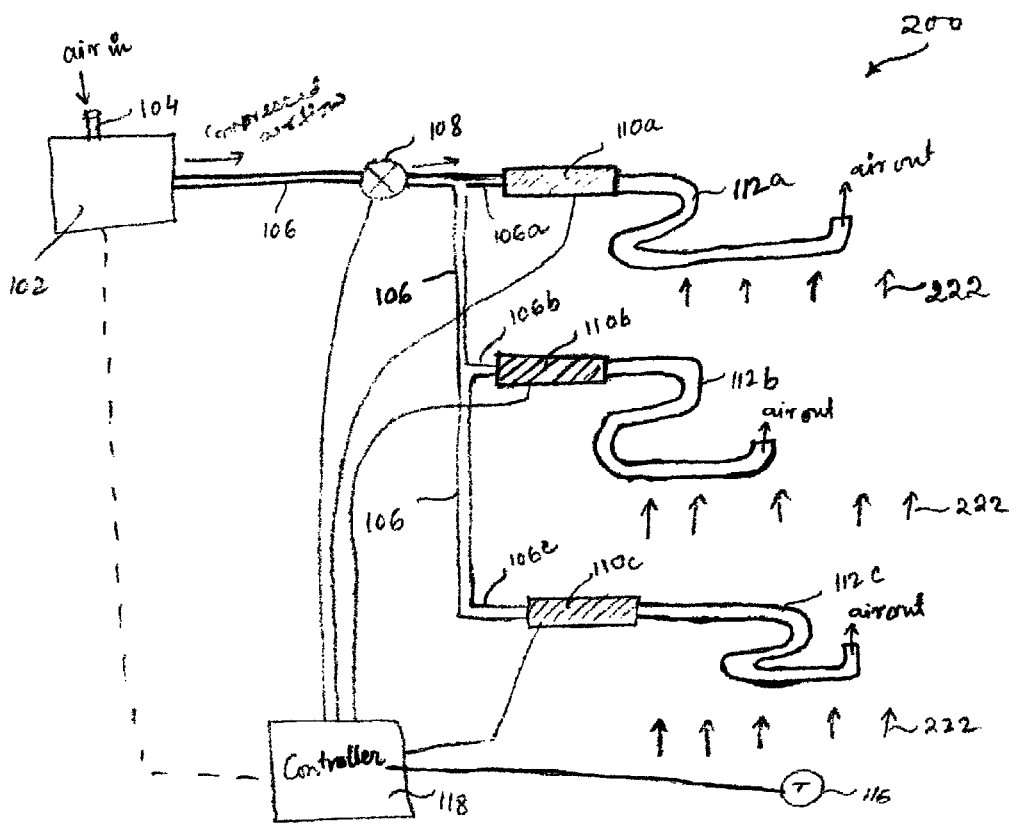
FIG. 2 illustrates an example multi-stage air temperature conditioning system, according to an embodiment of the present invention.

Though in FIG. 1, only one conduit 106 is shown delivering compressed air to thermal energy controlling means 110, in certain embodiments, separate compressed air conduits may be coupled to heating means and cooling means. Also, the thermal energy controlling means 110, i.e., heating means and/or cooling means may be arranged in one or more stages. FIG. 2 shows such an example system 200, where three stages of thermal energy controlling means 110a-c are connected in parallel. Compressed air is supplied to each thermal energy controlling means 110*a-c* by a corresponding conduit 106*a-c* that branches out from the main conduit 106. Electronic controller 118 controls each of the thermal energy controlling means 110*a-c*. Each thermal energy controlling means 110*a-c* is coupled to a corresponding heat exchanger mass 112 *a-c*. Heat exchanger masses 112*a-c* may be staggered physically, as shown in FIG. 2, to ensure that a flow of external air 222 can reach greater surface area of the heat exchanger masses 112 while flowing over the heat exchanger masses 112. Flow of external air 222 may be created by a fan/blower, which is not shown in FIG. 2, but is shown and discussed with reference to subsequent figures (e.g. FIGS. 7-10).

Persons skilled in the art will appreciate that different stages of thermal energy controlling means 110 can be arranged in series, in parallel, in a star configuration, in a ring configuration, in a polygonal configuration, or in any other geometric configuration. FIGS. 5A-5C show various example configurations for arranging thermal energy controlling means 110 and heat exchanger mass 112. In FIGS. 5A-5C, the example thermal energy controlling means are heat tube assemblies 300 (including heat tubes 310), as shown in FIG. 3, and the heat exchanger mass is a heating mass 512. In FIG. 5A, a single stage of heat tube assembly 300A is shown with a heat tube 310 inside a thermal shield 331. One end of heating mass 512A may extend inside the thermal shield 331 and forms a snug coupling with the heat tube 310 enclosing the pressure plate 334. In FIG. 5B, two stages of heat tube assemblies, 300A and 300B, each with their corresponding heating masses 512A and 512B are connected in series. Note that air is pressurized inside heating mass 512B. In FIG. 5C, two stages of heat tube assemblies 300C and 300D are parallel to each other, having their respective parallel heating masses, 512C and 512D. In the example shown in FIG. 5C, heating masses 512C and 512D feed heated air to a commonly shared heating mass 512A. Other arrangements and geometric configurations are possible involving any number of heating or cooling means and heat exchanger masses.

Figure 6:
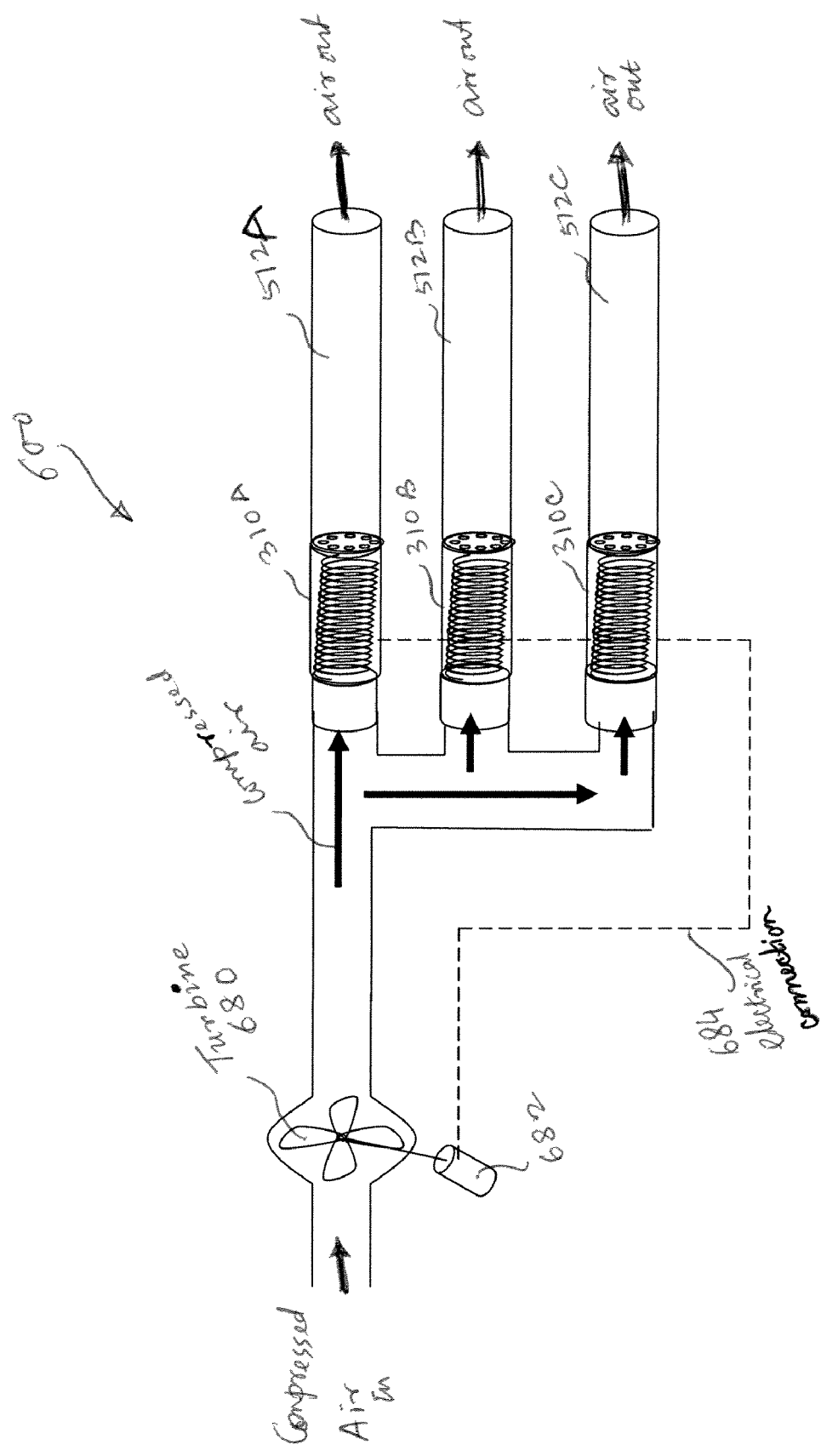
FIG. 6 illustrates an example embodiment of the present invention, where a flow of compressed fluid is used to generate electricity as well as to condition ambient temperature.

The compressed air being fed to the thermal energy controlling means 110 may perform additional work other than being used as a heat transport and/or heat transfer medium. Part of the internal energy in the compressed air can be used to generate electricity. For example, compressed air may run a turbine placed in the compressed air flow path, and generate electricity. The electricity may be used to heat up or cool down compressed air inside the thermal energy controlling means 110. FIG. 6 shows such an example system 600 having three stages of heat tubes 310A-C in parallel with their corresponding heating masses 512A-C. Compressed air runs turbine 680, which in turn runs electricity generator 682. Electricity generated by electricity generator 682 is used to feed electric heaters inside the heat tubes 310A-C. The dashed line 684 shows the electric connection between the electricity generator 682 and the electric heaters.

Example Implementations

1. Overall Household Heating/Cooling

Figure 7:
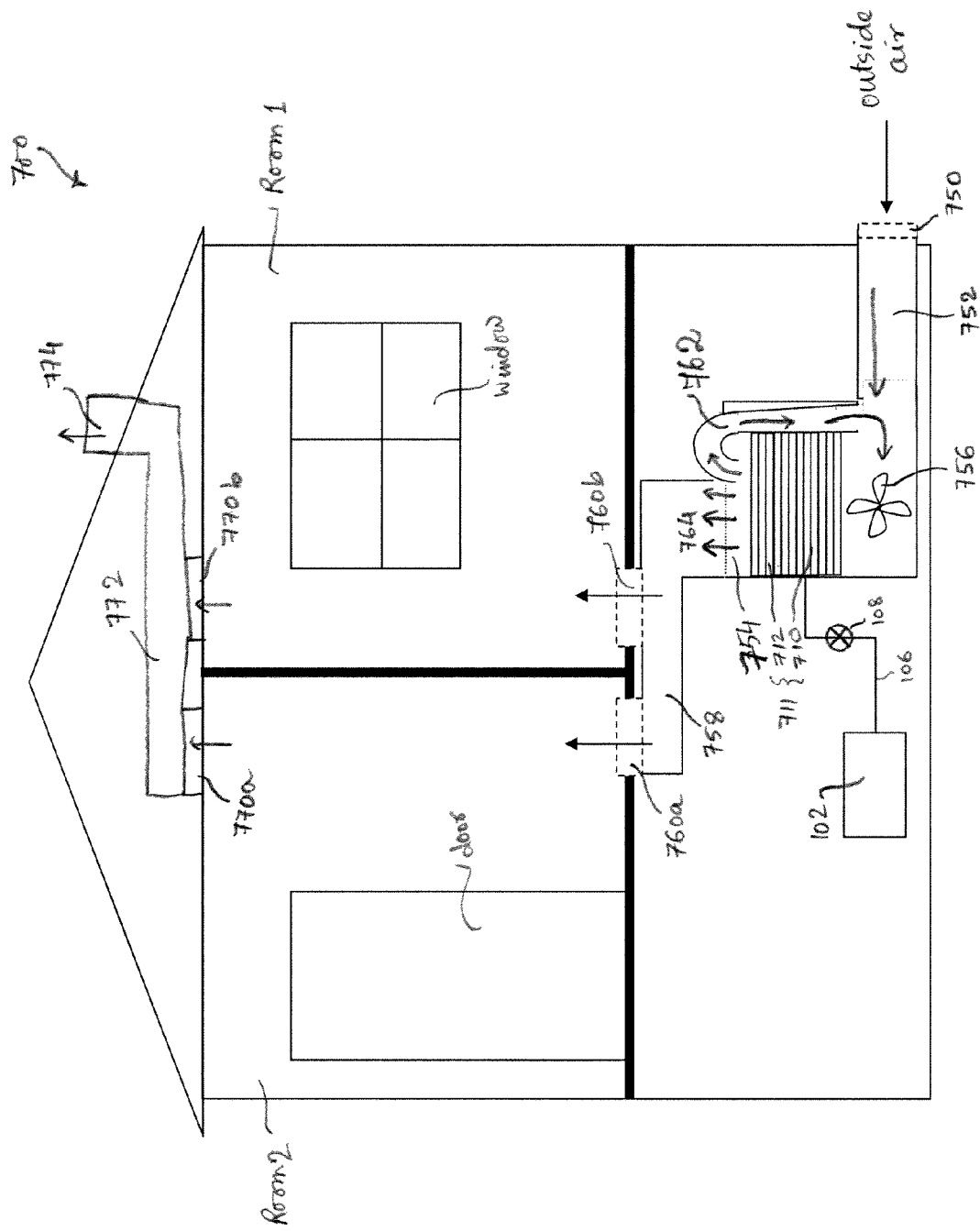
FIG. 7 illustrates an example HVAC system employed for residential or commercial climate-control, according to an embodiment of the present invention.

FIG. 7 shows a typical building with multiple rooms, in which an exemplary embodiment of the present invention is installed as a central temperature control system 700 akin to a HVAC system. System 700 takes in outside air that passes through a filter 750 into an entry duct 752. Entry duct 752 is coupled to a main duct 754 in which a temperature conditioning device 711 is installed. Temperature conditioning device 711 comprises one or more stages of heat tubes/vortex tubes 710 and heat exchanger mass 712. A fan or a blower 756 is configured to adjust the flow of air over the heat exchanger mass 712, including the flow of outside air. For example, when fan/blower 756 runs at a higher speed, more outside air is taken in and is made to flow over heat exchanger mass 712. Compressed air is fed to heat tube/vortex tube 710. As the compressed air passes through the heat tubes/vortex tubes 710, its thermal energy is actively controlled based on a signal received from a temperature monitoring device (not shown) within the building. For example, a heating mechanism (i.e., flow of compressed air through heat tubes or hot vortex tubes) is activated if the compressed air needs to be heated, and a cooling mechanism (i.e., a flow of compressed air through cold vortex tubes) is activated if the compressed air needs to be cooled. As the heated/cooled compressed air flows inside the heat exchanger mass 712, thermal energy is exchanged between air flowing inside the heat exchanger mass and outside air flowing over the heat exchanger mass, assisted by the blower/fan 756. For heating operation, cooler outside air becomes warmer by extracting heat from the heated air flowing inside the heat exchanger mass 712. For cooling operation, warmer outside air becomes cooler by transferring some of its heat to the air flowing inside the heat exchanger mass 712. Temperature-conditioned air 764 is then distributed to different rooms through distribution duct 758 and room vents 760*a-b*. A portion of the temperature conditioned air 764 is routed back towards the fan/blower 756 through a local feedback loop duct 762. The feedback loop duct 762 is optional. However, the feedback loop helps the electronic controller (not shown) adjust the speed of the blower/fan 756 efficiently. The rooms have adequate ventilation so that used air can get out of the rooms through vents 770*a-b*, and outlet duct 772 having an outlet port 774.

In the above example, fresh air from outside is taken in to reduce the quantity of undesired particulate pollutants (such as, allergens, pathogens etc.), in the flow of air that goes into the structure. This open loop configuration maintains a better air quality than conventional systems that typically re-circulate air. However, it is to be understood that re-circulated air can also be fed to system 700 as the source of air going into the compressor 702, and/or as the air entering main duct 754.

In FIG. 7, though only temperature conditioning has been elaborated, persons skilled in the art will understand that the system may work with other add-ons, such as a humidity control device, an air purification device, etc. for more comprehensive indoor climate control.

Figure 8:
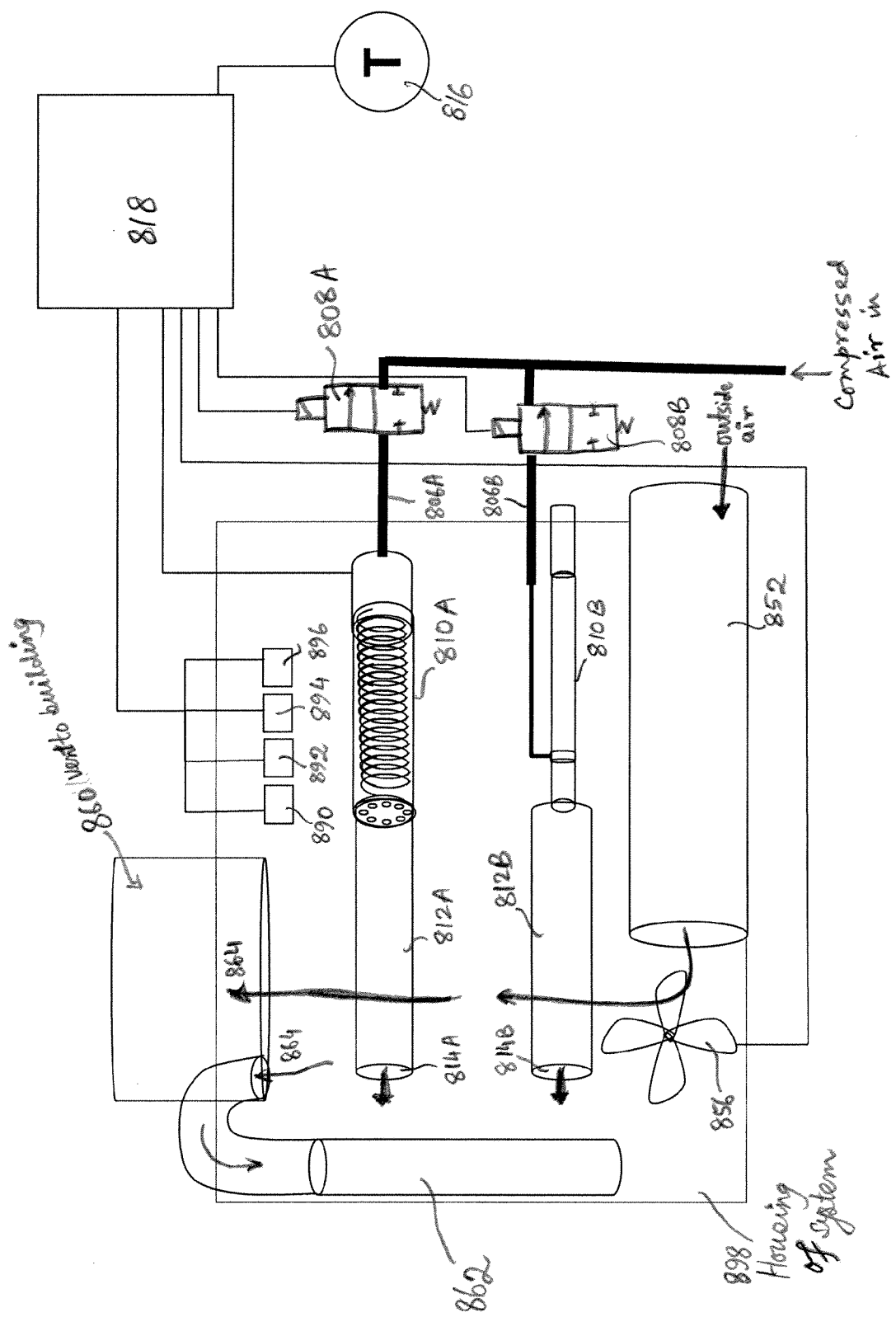
FIG. 8 illustrates component details of an example heating/cooling unit, according to an embodiment of the present invention.

FIG. 8 shows a more detailed view of an example compressed air heating/cooling system 800, that can be used in a building or structure as part of a HVAC system, or as a standalone portable/fixed system inside a system housing 898. System 800 has a compressed air conduit 806A carrying compressed air to a heat tube 810A, and another compressed air conduit 806B carrying compressed air to a cold vortex tube 810B. Flow of compressed air to heat tube 810A is regulated by solenoid valve 808A, and flow of compressed air to cold vortex tube 810B is regulated by solenoid valve 808B. A heating mass 812A is coupled to heat tube 810A, and a cooling mass 812B is coupled to cold vortex tube 810B.

System 800 may be operated in various modes, such as, a heating mode, a cooling mode, a combined heating and cooling mode (where system operation is switched between heating and cooling modes, as required), an external air flow only mode, etc.

For the heating mode of operation, electronic controller 818 receives a signal from temperature monitoring device 816, and sends instruction to close valve 808B, and open valve 808A, so that compressed air at room temperature or a lower temperature is delivered to heat tube 810A. Though only one heat tube is shown in FIG. 8, more stages of heat tube may be used. Hot vortex tubes may be used too in place of the heat tubes, or in combination with the heat tubes. Electronic controller 818 determines the amount of thermal energy to be added to the compressed air. An overheat temperature sensor 890 sends a signal to controller 818 to cut off the source of thermal energy to the heat tube 810A when a certain temperature is reached. Once the heated compressed air reaches heating mass 812A, the temperature of the heating mass is raised. Another temperature sensor, referred to as the hot fan sensor 892, measures the temperature of the heating mass 812A, and when a certain temperature is reached by the heating mass 812A, a signal is sent to the controller 818, so that a fan/blower 856 is activated by the controller. When the fan/blower 852 runs, external cooler air enters system 800 through entry air duct 852, and is directed to flow over heating mass 812A. Thermal energy is transferred from the heating mass 812A to the external air flow. Heated air flowing inside the heating mass also gets released at open end 814A of the heating mass 812A, and gets mixed with the external air flow to create temperature-conditioned air flow 864. A portion of the temperature-conditioned air flow 864 is released inside an enclosed space inside a structure through a vent 860. Another portion of the temperature conditioned air 864 is routed back towards the fan/blower 856 through local feedback loop duct 862. This local feedback system significantly reduces heat loss from the heating mass 812A and boosts the degree of temperature-conditioning by regulating the flow of external air over the heating mass 812A.

For the cooling mode of operation, electronic controller 818 receives a signal from temperature monitoring device 816, and sends instruction to close valve 808A, and open valve 808B, so that compressed air at room temperature or a higher temperature is delivered to cold vortex tube 810B. Though only one cold vortex tube is shown in FIG. 8, more stages of cold vortex tube may be used. Electronic controller 818 determines the amount of thermal energy to be extracted from the compressed air. An excess cold temperature sensor 894 sends a signal to controller 818 to cut off the cooling mechanism when a certain temperature is reached. Once the cooled compressed air reaches cooling mass 812B, the temperature of the cooling mass 812B is lowered. Another temperature sensor, referred to as the cold fan sensor 896, measures the temperature of the cooling mass 812B, and when a certain low temperature is reached by the cooling mass 812B, a signal is sent to the controller 818, so that the fan/blower 856 is activated by the controller. When the fan/blower 852 runs, external warmer air enters system 800 through entry air duct 852, and is directed to flow over cooling mass 812B. Thermal energy is transferred to the cooling mass 812B from the external air flow. Cooled air flowing inside the cooling mass 812B also gets released at open end 814B of the cooling mass 812B, and gets mixed with the external air flow to create temperature-conditioned air flow 864. A portion of the temperature-conditioned air flow 864 is released inside an enclosed space inside a structure through a vent 860. Another portion of the temperature conditioned air 864 is routed back towards the fan/blower 856 through local feedback loop duct 862. This local feedback system significantly reduces cold loss from the cooling mass 812B and boosts the degree of temperature-conditioning by regulating the flow of external air over the cooling mass 812B.

Though some described embodiments of the present invention are used for conditioning a temperature for a living area used by people, persons skilled in the art will appreciate that the invention can be modified to achieve any range of temperatures. For example, an oven or a sauna may require different degrees of high temperatures, while a refrigerator or a cold storage may require different degrees of low temperatures. Examples of such systems are discussed later with reference to FIGS. 9-11. Below, some example calculations for heating and cooling system requirements are presented for illustrative purposes.

Example Heating System Calculation

For home heating requirement calculation, a twenty-five hundred (2500) square-foot house with ten (10) foot ceilings is assumed. The house will therefore have a volume of 2,500*10=25,000 cubic feet.

Volume of air to warm up: 25000 ft3=707.92 m$^3$
Density of air: 1.25 kg/m$^3$
Mass of air to warm up: 707.92 m$^3$*1.25 kg/m$^3$=884.9 Kg.
Specific heat of air=1.005 kJ/kg ° C.
Start temp=5° C.
End temp=25° C.

The amount of energy needed to heat up the air by 1° C. is calculated below.

Thermal energy, $Q=mc(\Delta T)$, where m is the mass, c is the specific heat, and $\Delta T$ is the temperature difference To raise the temperature of air in the house by 1° C. per unit time, heat energy needed:

Q=884.9*1.005*1=889.3245 kJ

So for the system to produce 889.2345 kJ of heat, following specification is used:

Specific heat of steel heating mass=0.49 kJ/kg ° C.
Mass of the heating mass m=20 Kg
$Q=m_{heating\ mass}*c_{heating\ mass}*\Delta T_{heating\ mass}$
889.324 kJ=20 Kg*0.49*$\Delta T_{heating\ mass}$
$\Delta T_{heating\ mass}$=90.74° C. for one degree C. increase of ambient air temperature In other words, the temperature of the heating mass should go up by about 90° C. in order to raise the temperature of the air in the house by 1° C.

Calculations by the inventors have shown that an air flow rate of 8,596 CFM (cubic feet per minute) is required to flow through the heating mass for 1° C. rise in ambient temperature.

This requires that the temperature of the heating mass must be at one hundred eighty degrees Celsius (180° C.) for a two degrees Celsius (2° C.) rise in temperature to allow one degree Celsius (1° C.) loss for ambient heat loss through windows and doors. Since the house needs to reach about twenty-five degrees Celsius (25° C.) to be at a comfortable temperature, it will take about twenty (20) minutes taking into account one degree Celsius (1° C.) per minute loss for the temperature. Said time period to reach optimal temperature range can be decreased by increasing the temperature rise of the heating mass. It should be noted that if the temperature at the input end of a heating mass coupled to a heat tube may be at 350-500° C., the temperature at the release end may be at 170-200° C. This difference is caused by convection of air over the heating mass. Part of the 170-200° C. air is returned back into the heating and cooling system though the feedback loop.

Example Cooling System Calculations

A 2,500 square-foot structure with 10-foot ceilings is assumed. The structure will therefore have a volume of 2,500*10=25,000 cubic feet.

25,000 ft$^3$=707.92 m$^3$
Mass of air to cool 707.92 m$^3$*1.25 Kg/m$^3$=884.9 Kg
Specific heat of air=1.005 kJ/Kg ° C.
Start temperature=30° C.
End temperature=20° C.

"Q", the amount of energy needed to cool air by 1° C. is:
$Q=mc(\Delta T)$, m is mass, c is specific heat, $\Delta T$ is temperature difference Therefore, to decrease the air temperature by 1° C., energy to be extracted:

Q=884.9*1.005*1=889.3245 kJ

Each example vortex tube with a rating of 2,000 BTU per hour will extract 2,109 kJ per hour, and therefore 35.15 kJ per minute. To cool the structure by 1° C. in 1 minute, 884.9 kJ of energy per minute must be removed from the structure's air. To do this, the minimum number of vortex tubes required must be determined:

Number of vortex tubes=884.9 kJ/35.15 kJ=25 tubes

The temperature the cooling mass must reach can now be determined:

Total energy extracted: 25*35.15 kJ=878.75 kJ $Q = m_{cooling\ mass} * c_{cooling\ mass} * \Delta T_{cooling\ mass}$ Specific heat of stainless steel cooling mass, $c_{cooling\ mass}$=0.49 kJ/kg ° C.

Mass of the cooling mass $m_{cooling\ mass}$=60 Kg 878.75 kJ=60 Kg*0.49*$\Delta T_{cooling\ mass}$ $\Delta T_{cooling\ mass}$=30° C.

Therefore, the cooling mass temperature must decrease by at least 30° C. to cool the ambient temperature of the structure by 1° C. per minute. To do this, the temperature of cooling mass must actually decrease by 60° C. for a 2° C. decrease in air temperature to allow for 1° C. of ambient cold loss. Since the structure needs to reach about 20° C. to be at a comfortable temperature, it will take 10 minutes with 1° C. per minute loss for the temperature to reach the comfortable 20° C. range. The time required to reach the optimal temperature range can be decreased by increasing the temperature drop of the cooling mass.

By increasing the number of vortex tubes to fifty, the vortex tubes can then remove 1,757 kJ of energy from air, which is enough to account for about 1° C. loss per minute.

50*35.15 kJ=1,757 kJ 1,757 kJ=60 Kg*0.49*$\Delta T_{cooling\ mass}$ $\Delta T_{cooling\ mass}$=60° C.

Each tube uses 20 CFM of compressed air. Fifty tubes then use 1,000 CFM of compressed air. Therefore, 10,000 CF for ten minutes will decrease the air temperature inside the structure from 30° C. to 20° C.

A 5 HP compressor that can produce 100 CFM of compressed air at 80 PSI will use about 3.73 kW of energy per hour for 6,000 CF per hour. To produce 10,000 CF for 10 minutes, the same compressor needs to run for two hours (12,000 CF of air) or 7.46 kW.

Note that the example heating and cooling calculations are for illustrative purposes only, and are not limiting to the scope of the invention.

2. Heating Appliance

Figure 9:
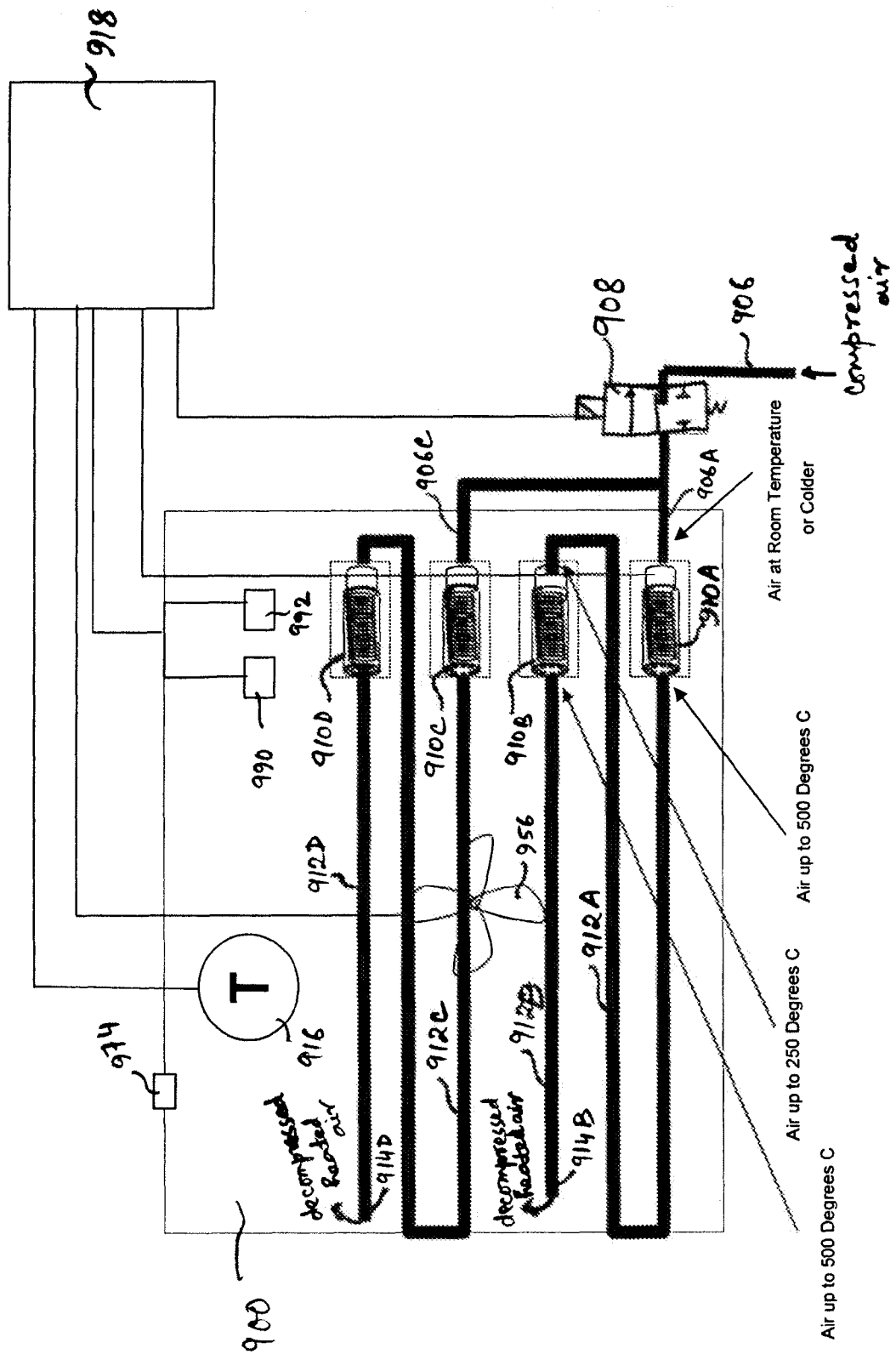
FIG. 9 illustrates an example oven, where a heating embodiment of the present invention is implemented.

FIG. 9 shows an example appliance using compressed air to efficiently heat up the inside enclosed space 900 of the structure, e.g., an oven. A compressed air flow comes through the conduit 906 and is regulated by the solenoid valve 908. The compressed air flow is branched out to parallel conduits 906A and 906C. Two parallel cascades of heat tubes are arranged along the walls/ceiling/floor of the oven. Each cascade have two stages of heat tubes, connected in series. Heat tubes 910A and 910B form the first cascade, and heat tubes 910C and 910D form the second cascade. Persons skilled in the art will appreciate that the number of parallel cascades, and number of stages in each parallel cascade may vary depending upon the total heat requirement, as well as the spatial heat distribution in the oven. Heat tubes 910B and 910D may act as local heat boosters. Heated air remains compressed inside heating masses 912A and 912C. Heated air loses pressure once it reaches heating masses 912B and 912D, and gets released inside the enclosed space 900 from the open ends 914B and 914D. Instead of bringing in external air flow, air inside the oven is re-circulated by the fan/blower 956 over the heat exchanger masses 912A-D. Temperature monitoring device 916, controller 918, overheat sensor 990 and hot fan sensor 992 perform similar functions as corresponding temperature monitoring device 816, controller 818, overheat sensor 890 and hot fan sensor 892, described with respect to FIG. 8. Exhaust vent 974 is the hot air exit. Heating masses 912A-D help fine-tuning the temperature inside the oven.

3. Cooling Appliance

Figure 10:
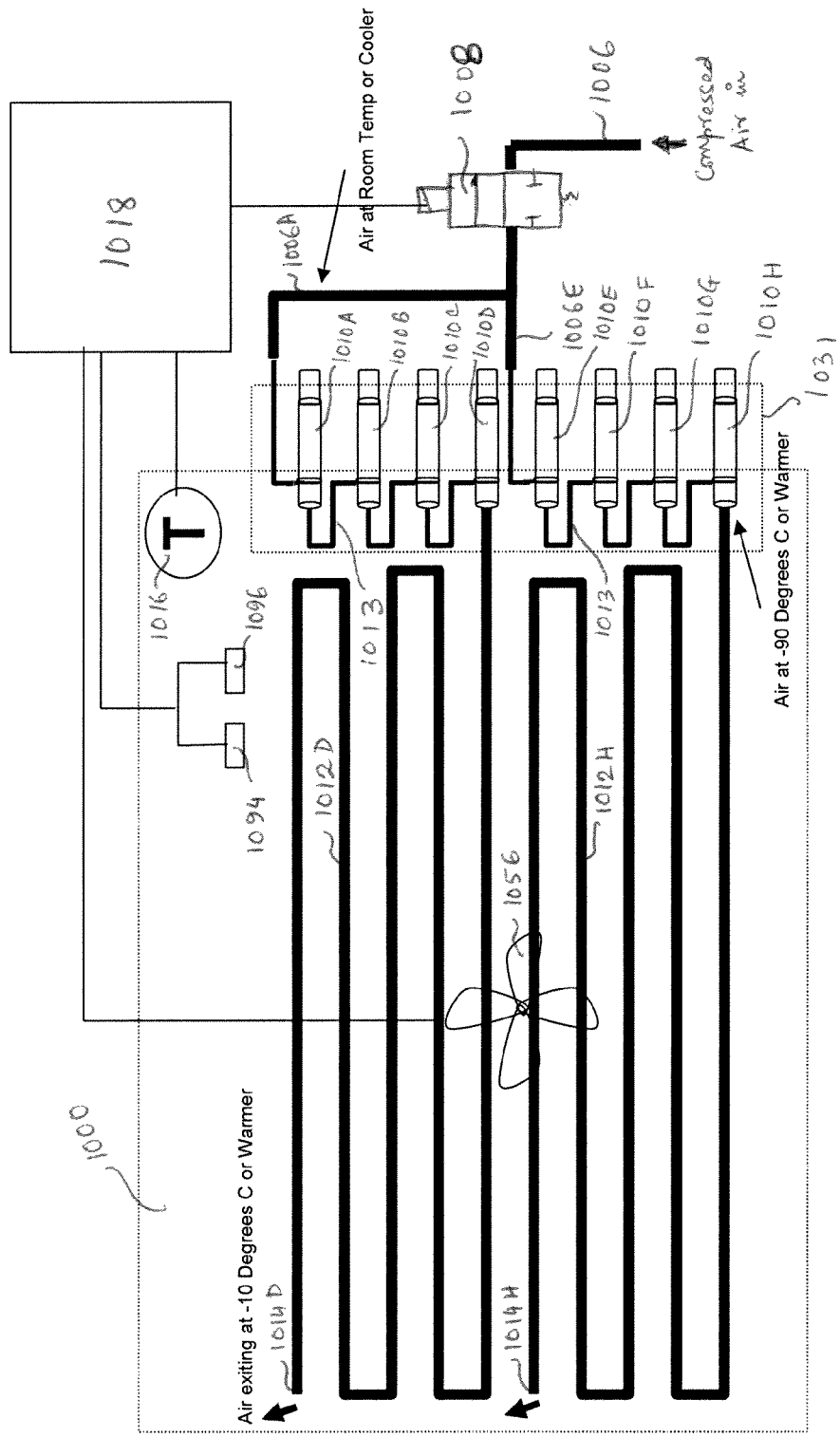
FIG. 10 illustrates an example refrigerator, where a cooling embodiment of the present invention is implemented.

FIG. 10 shows an example appliance using compressed air to efficiently cool down the inside enclosed space 1000 of a structure, e.g., a refrigerator. A compressed air flow comes through the conduit 1006 and is regulated by the solenoid valve 1008. The compressed air flow is branched out to parallel conduits 1006A and 1006E. Two parallel cascades of cold vortex tubes are arranged along the walls/ceiling/floor of the refrigerator. Each cascade have four stages of cold vortex tubes, connected in series. Cold vortex tubes 1010A-D form the first cascade, and cold vortex tubes 1010E-H form the second cascade. Persons skilled in the art will appreciate that the number of parallel cascades, and number of stages in each parallel cascade may vary depending upon the total cooling requirement, as well as the spatial distribution of cool air in the refrigerator. Air remains compressed inside connecting tubes 1013, as the air gets progressively cooler after passing through each cold vortex tube. Cooled air loses pressure once it reaches cooling masses 1012D and 1012H, and gets released inside the enclosed space 1000 from the open ends 1014D and 1014H. Instead of bringing in external air flow, air inside the refrigerator is re-circulated by the fan/blower 1056 over cooling masses 1012D and 1012H. Temperature monitoring device 1016, controller 1018, excess cold temperature sensor 1094 and cold fan sensor 1096 perform similar functions as corresponding temperature monitoring device 816, controller 818, sensor 894 and sensor 896, described with respect to FIG. 8. Cold vortex tubes may be thermally insulated inside a thermal shield 1031 with respective exhaust ports of the cold vortex tubes releasing hot air streams outside the thermal shield 1031.

4. Localized Heating/Cooling for Various Household Applications

Figure 11A:
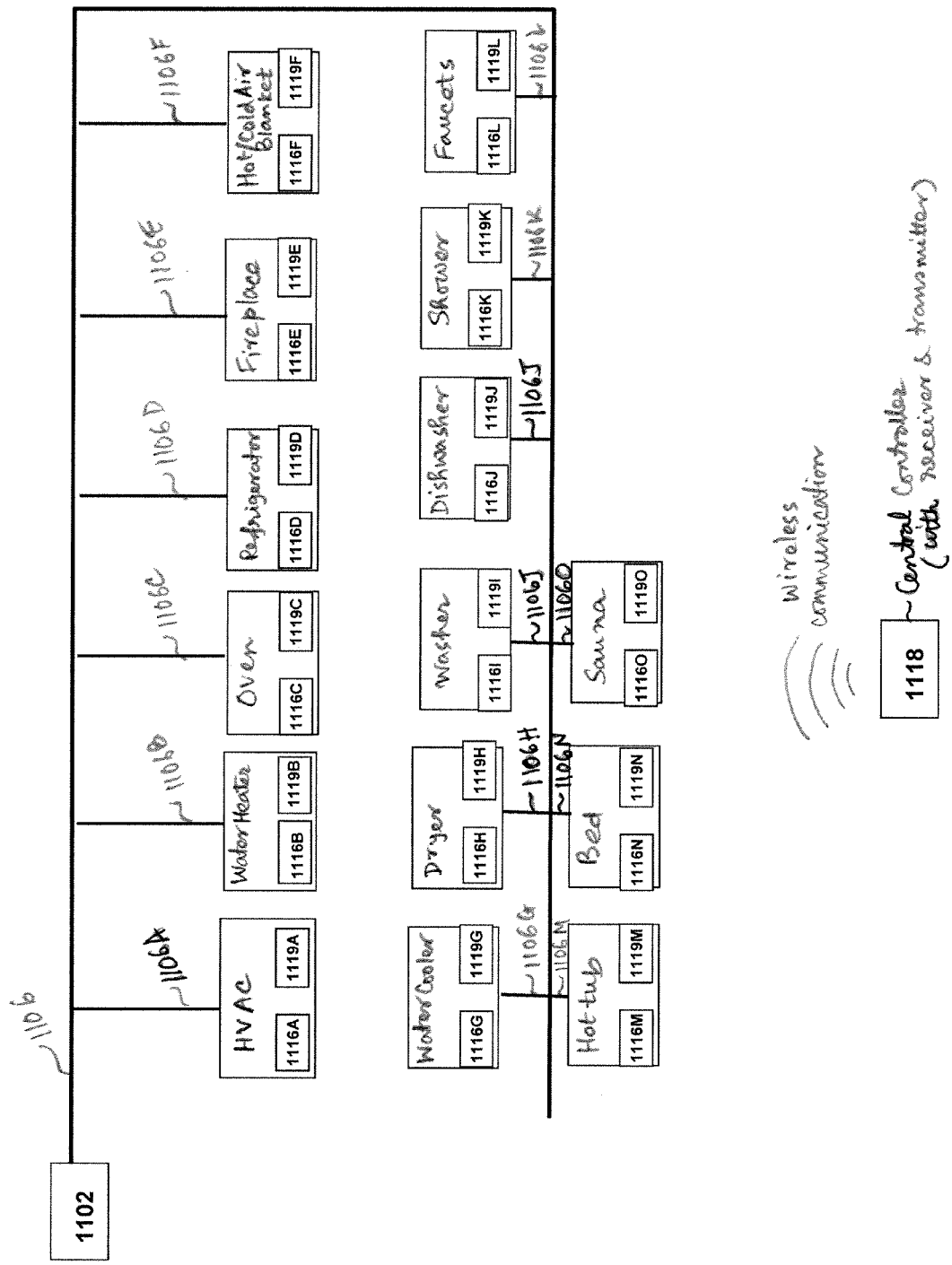
FIG. 11A illustrates a number of household application areas where localized temperature control is achieved, according to an embodiment of the present invention.
Figure 11B:
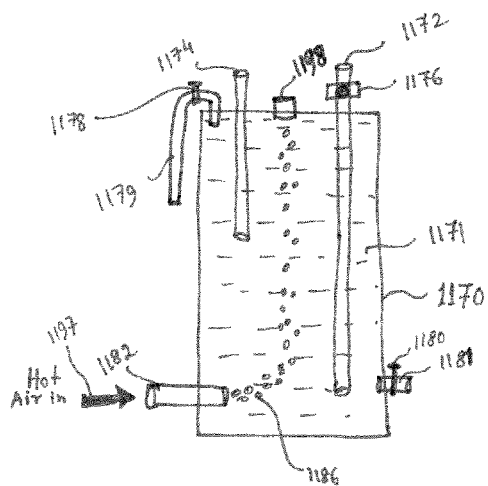
FIGS. 11B-E illustrate embodiments of the present invention for household water heating.
Figure 11C:
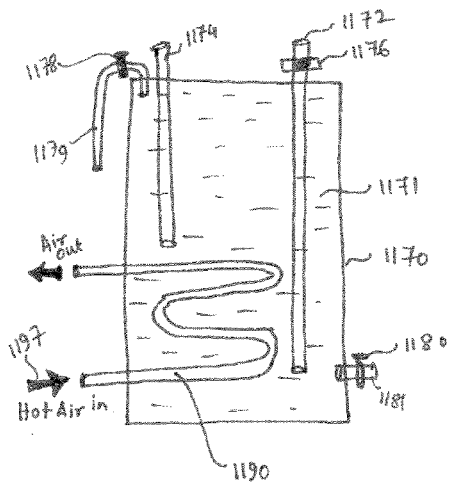

FIG. 11A schematically shows that the scope of the invention is not limited to heating or cooling only one enclosed space. FIG. 11A shows a number of household application areas where localized temperature control is achieved, according to an embodiment of the present invention.

Individually controlled localized space heating and/or cooling can be achieved by using compressed air as a heat transport/transfer medium. Compressed air ducts 1106A-O can be built to deliver compressed air locally at various locations or appliances from a compressed air source 1102, as shown in FIG. 11A. Though not shown in FIG. 11A, flow regulator valves may be included to control local delivery of compressed air. Each location or appliance has a corresponding local temperature monitoring device 1116A-O where a locally desired temperature can be set. Each of the local temperature monitoring devices 1116A-O may communicate to a central electronic controller 1118 via wireless (Wi-Fi, radio frequency etc.) connections. Wired connections may be used too. The central electronic controller 1118 then sends operational command signals to a corresponding local temperature control system 1119A-O. Each of the local temperature control systems 1119A-O comprises local thermal energy controlling means (such as heat tubes and/or vortex tubes) and local heat exchanger masses (heating mass or cooling mass). Local internal feedback loops, and local entry ducts for supplying external air locally may also be included in individual temperature control systems 1119A-O, depending on the end application. The localized spaces may be physically separated. For example, a refrigerator is physically separated from an oven. However, a number of localized spaces may share a common living space. For example, a bed with a hot air blanket may be in one side of a room, while another side of the room is chilled for cooling beverages. Locally desired temperature may be set manually or can be pre-programmed.

Figure 11D:
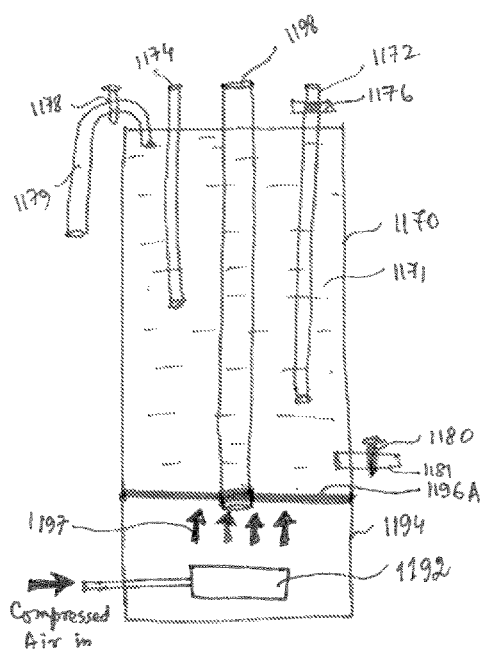
Figure 11E:
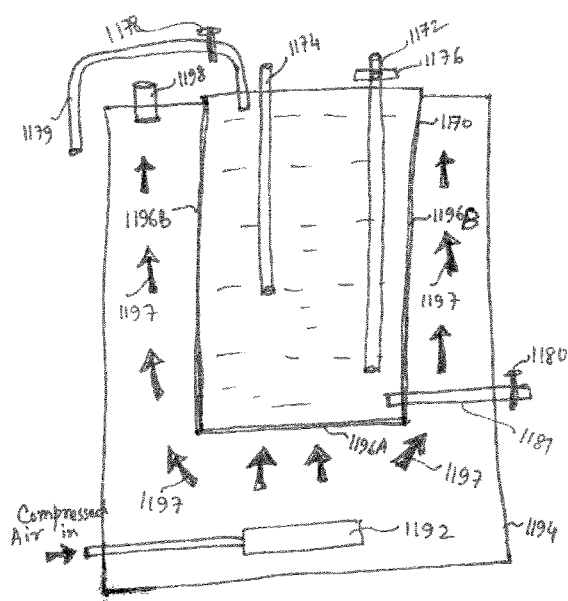

Also, the teachings of the invention are not limited to just temperature conditioning of ambient gases. For example, heated air generated by the embodiments of the present invention may be used to condition a desired temperature of household water supply. FIGS. 11B-E show a water tank 1170 filled with water 1171, where cold water comes in through inlet pipe 1172 (fitted with shutoff valve 1176), and hot water comes out through outlet pipe 1174. Water tank 1170 supplies hot water through plumbing lines running inside the household delivering water to different locations, such as the kitchen, the laundry room, the shower etc. Water tank 1170 is fitted with a pressure release mechanism (valve 1178 and overflow pipe 1179), and a drainage mechanism (valve 1180 and drain pipe 1181). Heated air 1197 produced by embodiments of the present invention heats up water 1171 in the tank 1170. Heated air 1197 may be a compressed air stream. In one embodiment (shown in FIG. 11B), heated air 1197 is released inside tank 1170 through an air inlet pipe 1182. The water tank 1170 has a vent 1198 so that air bubbles 1186 can escape, and trapped air in the outlet pipe 1174 is minimized. In an alternative embodiment (shown in FIG. 11C), heated air 1197 is circulated within a serpentine duct 1190 with thermally conductive surface, so that heat from the air flowing inside the duct 1190 is transferred to the water 1171 inside the tank 1170. In this embodiment, air is not mixed with water. In yet another embodiment, shown in FIG. 11C, a furnace 1192 according to the present invention is installed within a heating chamber 1194 coupled with the water tank 1170. The furnace 1192 takes in compressed air and produces heated air 1197. Heat is transferred to the water 1171 in the water tank 1170 from the chamber 1194 through thermally conducting bottom surface 1196A of the water tank 1170. The air vent 1198 extends from the bottom of the water tank 1170 to the top, as shown in FIG. 11D. Air vent 1198 has a thermally conductive sidewall to facilitate heat exchange to the water. The embodiment in FIG. 11E shows that the chamber 1194 may enclose the water tank 1170 from the sides also as well as from the bottom. In this case, heat is transferred to the water tank 1170 via thermally conducting sidewalls 1196B as well as bottom surface 1196A of the water tank 1170.

Other system configurations for water (or other fluid) heating are also within the scope of the invention. For example, instead of or in addition to heating up water inside a water tank 1170, heated air 1197 may heat up water flowing inside a water pipeline that runs through the chamber 1194.

Example System Operation with Hot and Cold Vortex Tubes

Figure 12:
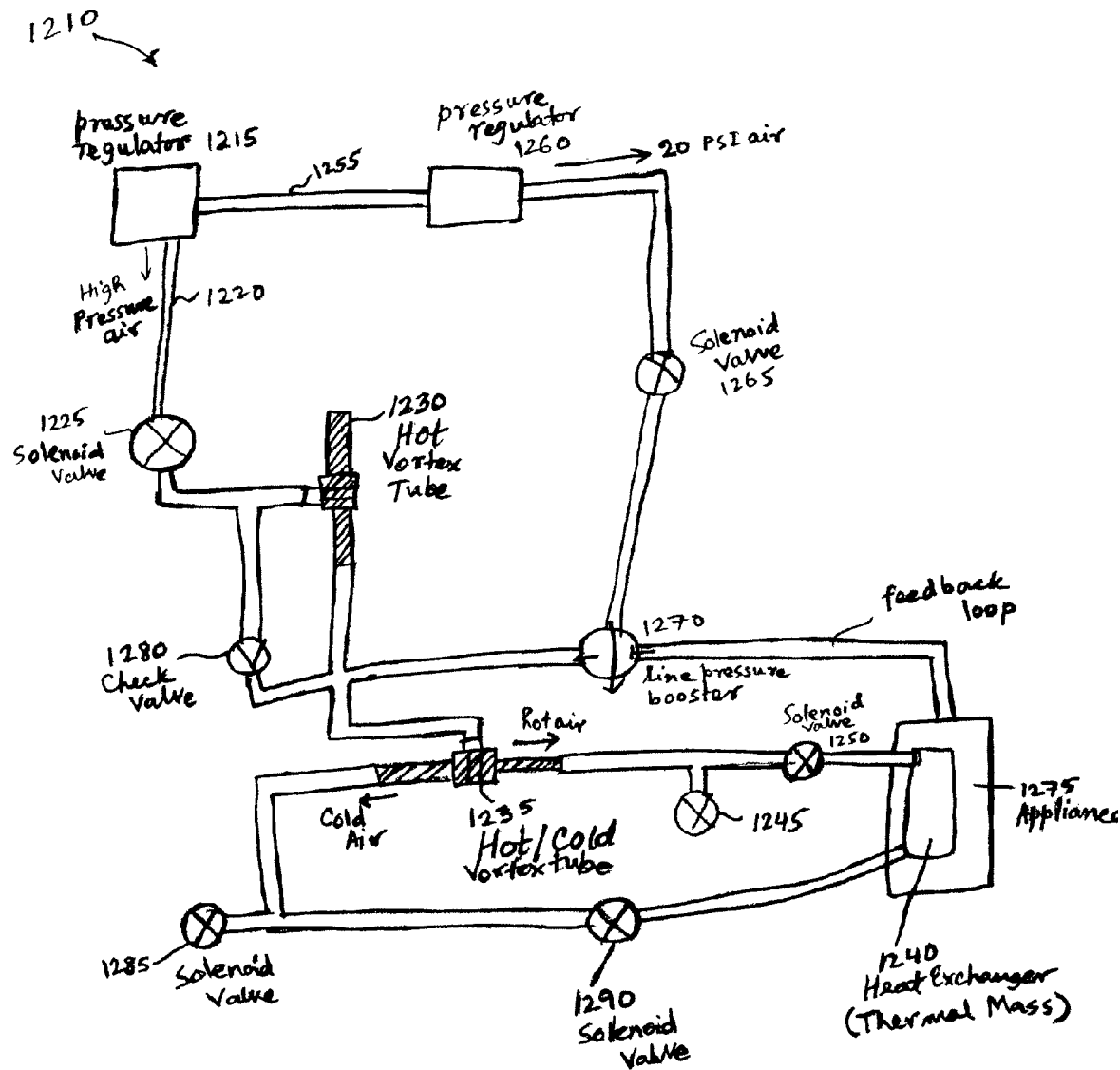
FIG. 12 illustrates a heating and cooling system utilizing vortex tubes, according to an embodiment of the present invention.

Referring to FIG. 12, a system flow diagram of a heating and cooling appliance 1210, according to an example embodiment of the present invention, is disclosed. The present invention utilizes a stream of compressed air which is regulated by a first pressure regulator 1215. The output of the first pressure regulator 1215 is divided into two (2) streams. A first compressed air stream 1220 is routed to a solenoid valve 1225. Air flow from the solenoid 1225 is then routed to a hot vortex tube 1230 which operates in a conventional and well-known manner to produce heat into a hot and cold vortex tube 1235. This compounding heating action produces a heat flow which is directed into a heat exchanger 1240 as controlled by a solenoid valve 1250. Each stage of the hot vortex tube 1230 and the hot and cold vortex tube 1235 will increase the air temperature by about two hundred degrees Celsius (200° C.) which will simultaneously create very cold air (about negative one hundred seventy degrees Celsius (−170° C.)) from the other side of the vortex tube. Using this combination of hot and cold air, it is possible to operate the heating, ventilation, and air conditioning (HVAC) system. Makeup air is introduced into this stream by a solenoid valve 1245 before the solenoid valve 1250. In such a manner, the efficiencies of previously heated air are realized. A second compressed air stream 1255 as produced through the first pressure regulator 1215 is routed through a second pressure regulator 1260 which reduces the air pressure stream to twenty (20) psi. The resultant air stream is controlled by a solenoid valve 1265 and routed to a line booster 1270. A feedback control circuit is routed from the heat exchanger 1240 in an appliance 1275 to the line booster 1270. As such, a resultant, controlled and high pressure air stream is routed through a check valve 1280 to be used in the hot vortex tube 1230. During cooling operation of the heating and cooling appliance 1210, the cool stream output of the hot and cold vortex tube 1235 is controlled by a solenoid valve 1285 and a solenoid valve 1290. Operation of the solenoid valve 1225, the solenoid valve 1245, the solenoid valve 1250, the solenoid valve 1265, and the solenoid valve 1290, and thus the overall operating sequence of the heating and cooling appliance 1210 will be described in greater detail herein below. The resultant hot or cold output of the hot and cold vortex tube 1235 will replace standard forced air gas, oil, or electric furnaces. The heating and cooling appliance 1210 forces clean, dry air into the ductwork infrastructure that is used with said conventional heating and cooling systems. Variations on the design will make it possible to apply the same technology to numerous heating and cooling functions.

In a furnace application, the system can raise the temperature of a one-story, twenty-five hundred (2500) square foot structure with standard insulation and existing ductwork from thirty-two degrees Fahrenheit (32° F.) to seventy-two degrees Fahrenheit (72° F.) within thirty (30) minutes. The system can be retrofitted to an existing furnace or installed with its own housing as a new HVAC system. The heating and cooling appliance 1210 will still utilize a conventional air distribution fan to aid in the distribution of the conditioned air throughout the ductwork and subsequent building structure. It should be noted that the compressed air as used with the heating and cooling appliance 1210 would be manufactured in a conventional process such as by air compressors, or as a by-product of other industrial processes which may be currently wasted. This heating and cooling appliance 1210 is energy-independent, which means the fuel or prime mover may be produced and provided in a variety of ways; the ultimate source of the compressed air is not an integral component of this design. As such, such origination or source of the compressed air should not be interpreted as a limiting factor of the present invention. It is envisioned that approximately a portion of the heated or cooled air generated by the heating and cooling appliance 1210 is released into the structure to be heated/cooled. The remaining portion of the processed air is routed into the feedback system as coordinated by the line booster 1270. This feedback system increases the efficiency of the heating and cooling appliance 1210 as time passes, since as the system operates, it requires less air and less original compressed air.

Figure 13:
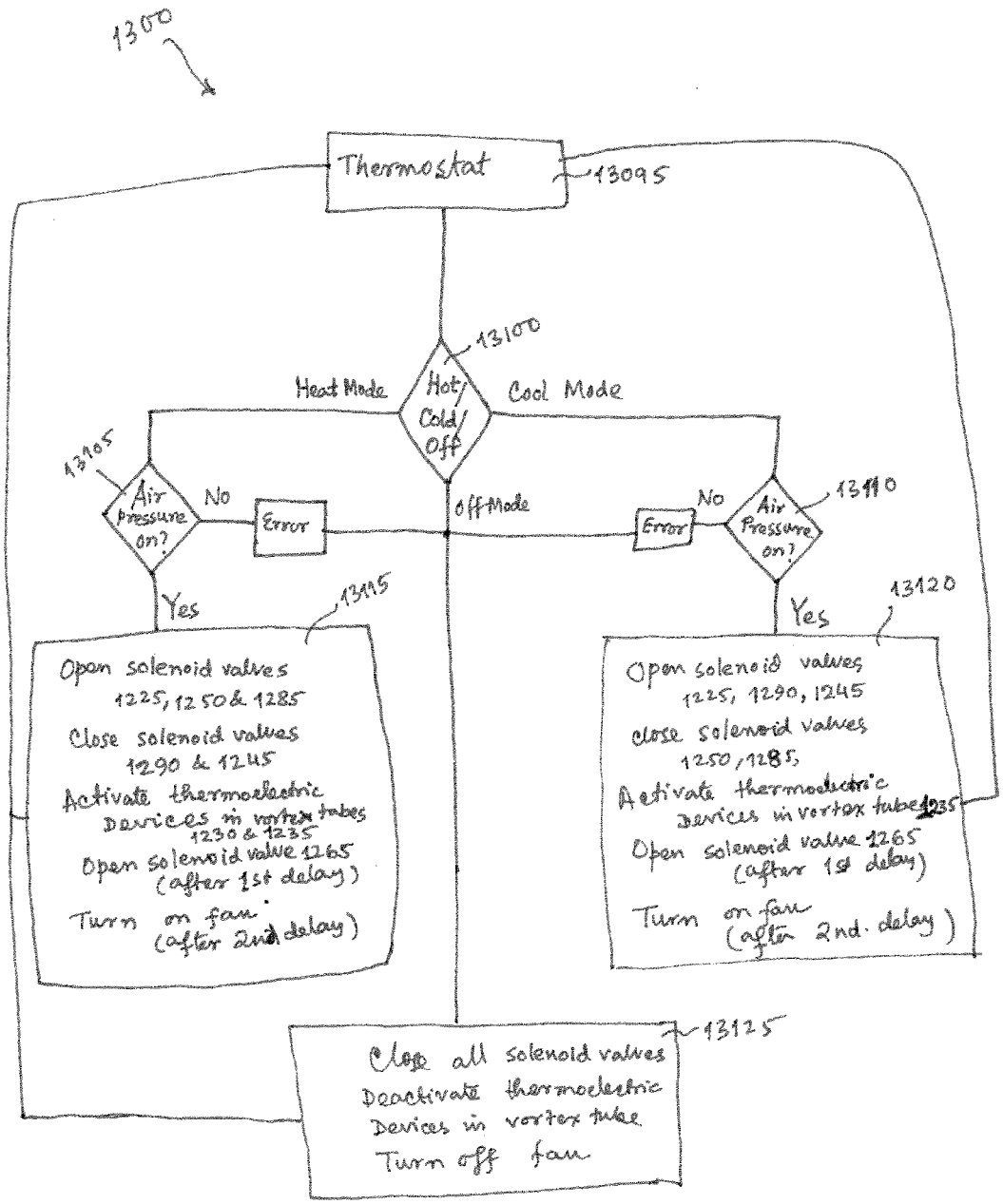
FIG. 13 illustrates a functional flow chart depicting a sequence of operation of the system shown in FIG. 12.

Referring to FIG. 13, a flow chart 1300 is shown, depicting the sequence of operation of the heating and cooling appliance 1210, according to the example embodiment of the present invention shown in FIG. 12. Note that when a solenoid is closed or activated, a corresponding solenoid valve is opened, and when a solenoid is open, i.e., deactivated, a corresponding solenoid valve is closed.

In flowchart 1300, sensing of the space or object temperature is made by a conventional thermostat at a first functional box 13095. The decision to operate in a heating or cooling mode is made at a first decision box 13100. In the case of a heating mode, the flow control progresses to a second decision box 13105. In the case of a cooling mode, the flow control progresses to a third decision box 13110. Negative output from either the second decision box 13105 or the third decision box 13110 results in an error condition. In other words, if there is not adequate air pressure, the system does not proceed to operate.

A positive output from the second decision box 13105 passes control to a second functional box 13115 which opens the solenoid valves 1225, the solenoid valve 1250 and the solenoid valve 1285, while the solenoid valve 1290 and the solenoid valve 1245 are closed. After a predetermined amount of delay (e.g., 1 minute delay) the solenoid valve 1265 is opened. After another predetermined amount of delay (e.g., a total of 2 minutes delay), the air distribution fan is energized.

A positive output from the third decision box 13110 passes control to a third functional box 13120 which opens the solenoid valve 1225, the solenoid valve 1290, and the solenoid valve 1245, and closes the solenoid valve 1250, and the solenoid valve 1285. After a predetermined amount of delay (e.g., 1 minute delay), the solenoid valve 1265 is opened. After another predetermined amount of delay (e.g., a total of 2 minutes delay), the air distribution fan is energized.

In the case of a negative response form the first decision box 13100, all the solenoid valves are closed in a fourth functional box 13125. The air distribution fan is de-energized after a two (2) minute delay.

It is envisioned that other styles and configurations of the present invention can be easily incorporated into the teachings of the present invention, and only one particular configuration shall be shown and described for purposes of clarity and disclosure and not by way of limitation of scope.

To the end user, the heating and cooling appliance 1210 will not look or feel different than conventional HVAC systems, since the user interface is a standard thermostat as depicted by the first functional box 13095. Once the system is turned on, the thermostat is set, and air pressure is available, the thermostat will turn on the air and electricity for cooling or heating as aforementioned described.

Example System Architectures

In this section, various system architectures and their corresponding operations are described with respect to FIGS. 14A-G, according to example embodiments of the present invention. In FIGS. 14A-G, thicker grey lines and arrows indicate compressed air flow path, and thinner dark lines indicate control/command lines between various components. In FIGS. 14A-G, a compressor/blower 1402 procures the compressed air supply to the system. In FIGS. 14A-G, though controller 1418, hot air relay 1420, pulse control module 1422, cold sensor 1424, heat sensor 1426, heater relay 1430, fan control module 1432, and cold air relay 1428 are shown as separate functional blocks, one skilled in the art will understand that all or some of these functional blocks may be integrated into a single functional unit, such as a controller 818 shown in FIG. 8. Additionally, the feedback loop 1462 is optional in the sense that the rest of the system may function even without the feedback loop 1462. However, preferably, a temperature of heat exchanger mass is monitored to regulate a flow of air over the heat exchanger mass, as discussed below. The fan 1452 either pushes air already inside the system, or takes in air from outside the structure, as shown in FIGS. 14A-G.

Figure 14A:
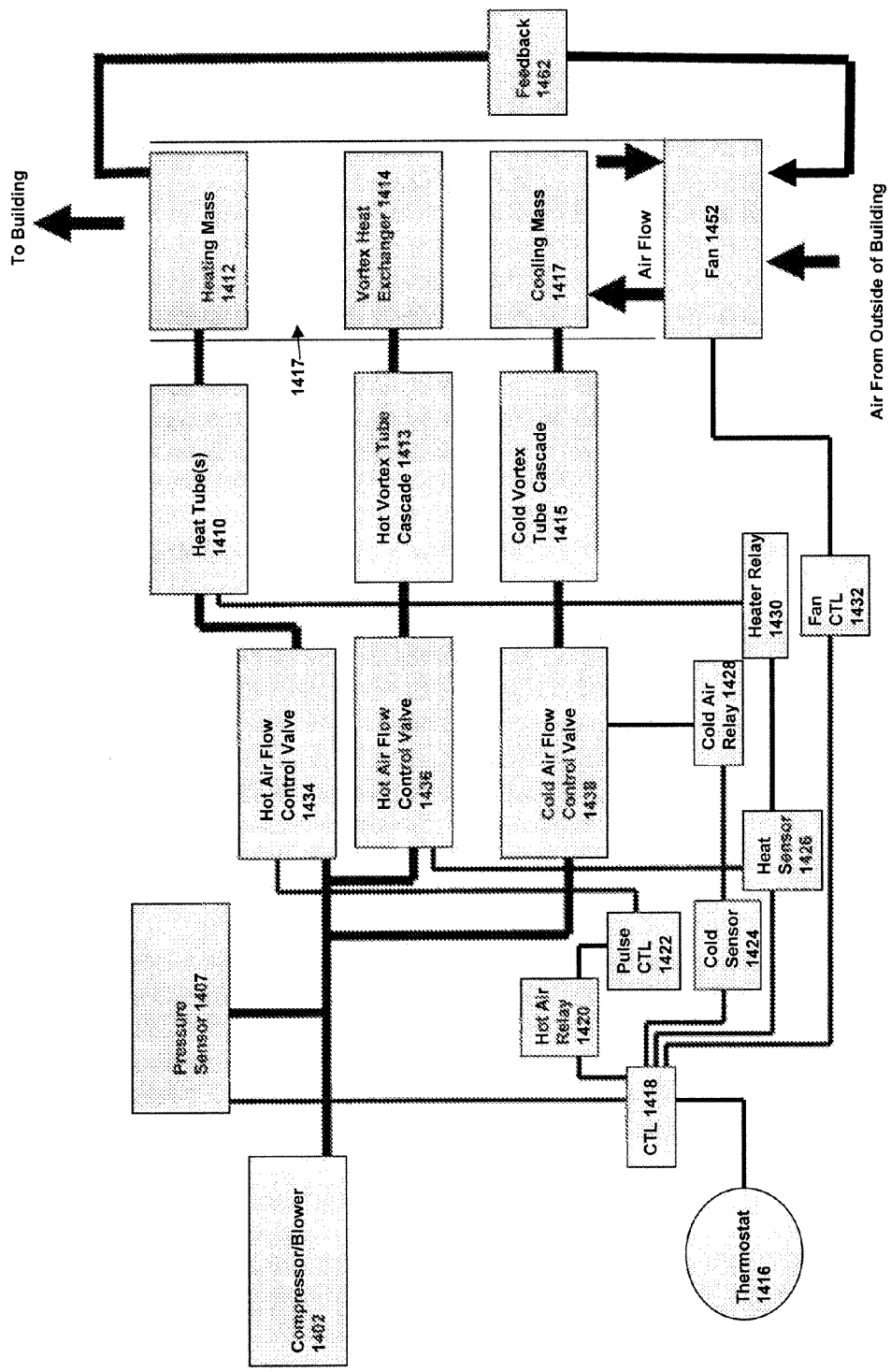
FIGS. 14A-G illustrate various system configurations, according to embodiments of the present invention.

A. Combined Heating and Cooling System with Heat Tubes and Hot and Cold Vortex Tube Configuration The configuration shown in FIG. 14A is intended for systems such as HVAC, environmental chambers, combination HVAC/refrigeration systems, refrigerators, combination HVAC/boiler/refrigerator systems, or any other applications that require either separate or simultaneous hot and cold air or hot and cold water. The combined heating and cooling system employs heat tubes and hot and cold vortex tubes, as described below.

a) Heating Mode

A thermostat 1416 activates the controller (CTL) 1418, which tests the signal from the pressure sensor 1407. If there is no air pressure to the system, the system will not turn on. When there is detectable pressure, controller 1418 activates hot air relay 1420. Hot air relay 1420 then activates hot air flow control valve 1434 and heat sensor 1426, and, in the case of a pulsed system, pulse control module 1422. The compressed air starts to flow into the heat tube(s) 1410. The heat sensor 1426 turns on the heater relay 1430. The heater relay 1430 turns on the heat tube(s) 1410. As air heats up, it continues to flow and enter the heating mass 1412. When the heating mass 1412 reaches a predetermined temperature, the fan control module 1432 starts the fan 1452. The fan 1452 pushes or pulls the air over the heating mass 1412 along the passage (air duct) 1427 and the heated air is sent into the building/structure through a vent, and into the feedback loop 1462. The feedback loop 1462 returns a portion of the heated air into the system. As the heat tube(s) 1410's temperature increases over a predetermined value, the heat sensor 1426 turns off the heater relay 1430, which turns off the heating source in the heat tube(s) 1410 until the heat tube(s) temperature decreases to a predetermined value. The heat sensor then turns the heating source in the heat tube(s) 1410 on again. The process continues until the room reaches the desired temperature and the thermostat 1416 signals controller 1418 to suspend operation.

Optionally, one or more vortex tube cascades 1413 may be added to this system configuration as an additional heating device in concert with heat tube(s) 1410. Vortex tubes may not require electricity to operate, but the heating action may be enhanced by using a thermoelectric circuit. An example vortex tube can generate a hot air flow having a temperature of 110° C. and can add 326 kJ or 309.2 BTU of energy to the heating effort of the system. The vortex tube cascade 1413 is also controlled in the same way as heat tube(s) 1410 with the exception that they do not require a pulse control module 1422. The cooled air produced as a byproduct of vortex tube cascade 1413's operation may be routed to a cooling system or simply exhausted out. When the heat sensor 1426 is activated, the hot air flow control valve 1436 starts the airflow into the vortex tube cascades 1413. Though not shown here, there may be a hot air relay coupled to the hot air flow control valve 1436. The vortex tube cascades 1413 transfer heat to the vortex heat exchanger 1414. The fan 1452 pushes or pulls the air over the vortex heat exchanger 1414 and the heated air is sent into the building/structure and to the feedback loop 1462. The feedback loop 1462 returns a portion of the heated air into the system. As the vortex tube cascades 1414's temperature exceeds a predetermined value, the heat sensor 1426 turns off the hot air flow control valve 1436, which turns off the operation of the vortex tube cascades 1413 until the vortex tube cascades 1413's temperature decreases to a predetermined value. The heat sensor 1426 then turns the hot air flow control valve 1436 on again. The process continues until the structure/building reaches the desired ambient temperature and the thermostat 1416 signals controller 1418 to suspend operation.

b) Cooling Mode

A thermostat 1416 will signal the system to cool the structure. The signal for cooling activates the controller 1418, which tests the signal from the pressure sensor 1407. If there is no air pressure to the system, the system will not turn on. When there is detectable pressure, controller 118 activates the cold sensor 1424. The cold sensor 1424 then activates the cold air relay 1428. The cold air relay 1428 then activates the cold air flow control valve 1438. The compressed air starts to flow into the cold vortex tube cascade 1415. As the air temperature decreases, it continues to flow and enter the cooling mass 1417. When the cooling mass 1417 reaches a predetermined temperature, the fan control module 1432 starts the fan 1452. The fan 1452 pushes or pulls the air over the cooling mass 1417 and the cooled air is sent into the structure/building and the feedback loop 1462. The feedback loop 1462 returns portions of the cooled air into the system. As the cold vortex tube cascade 1415's temperature decreases to a predetermined value, the cold sensor 1424 turns off the cold air relay 1428, which turns off the cold air flow control valve 1438 until the cold vortex tube cascade 1415's temperature decreases to a predetermined value. The cold sensor 1424 then turns the cold air flow control valve 1438 on again. The process continues until the structure/building reaches the desired ambient temperature and the thermostat 1416 signals controller 1418 to suspend operation.

B. Heating-Only System with Heat Tubes

Figure 14B:
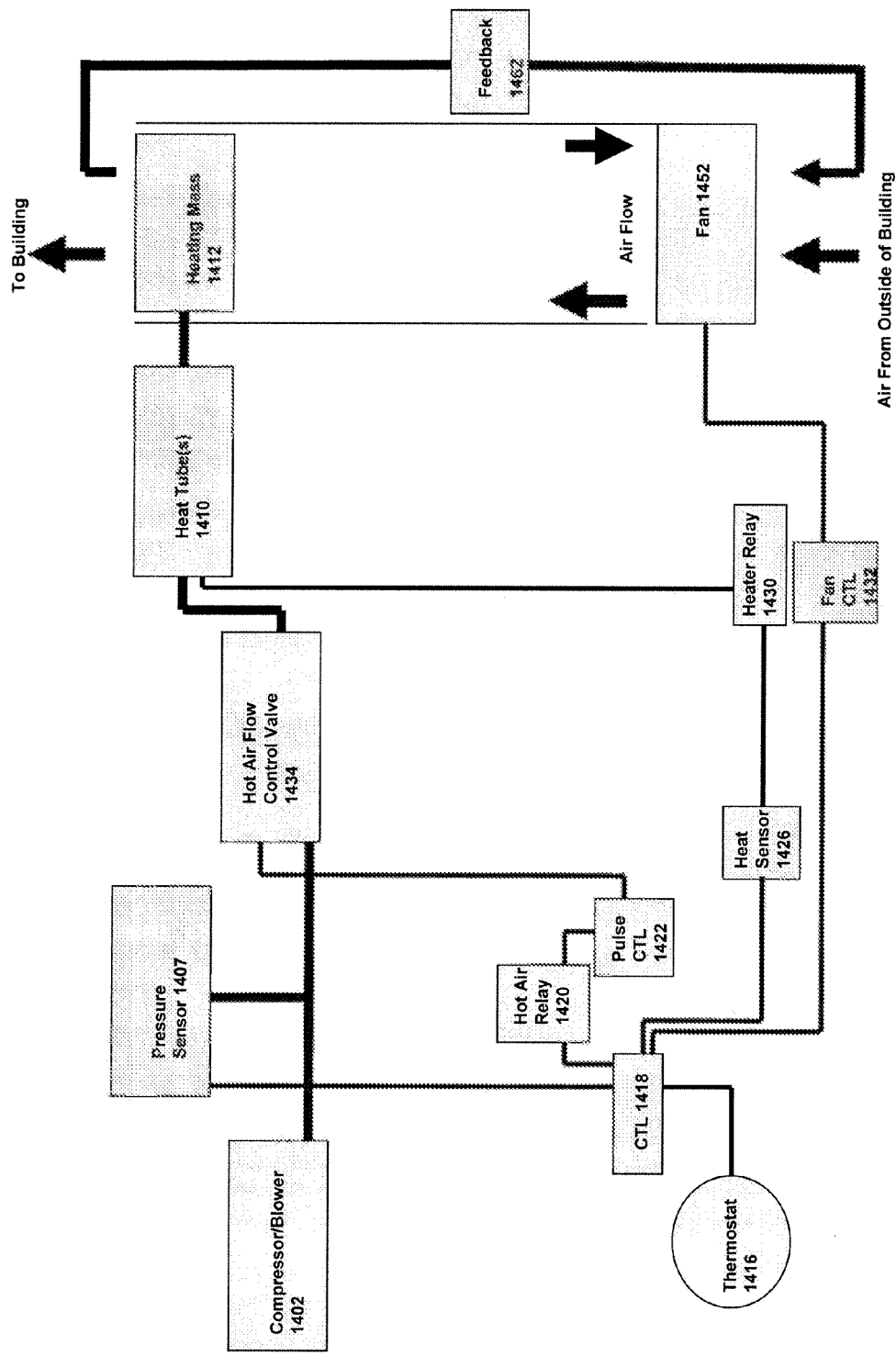

The configuration shown in FIG. 14B is intended for systems that produce hot air only such as heaters, ovens, dryers, fireplaces, boilers, and all other applications requiring very high temperatures hot air or hot water.

A thermostat 1416 activates the controller (CTL) 1418, which tests the signal from the pressure sensor 1407. If there is no air pressure to the system, the system will not turn on. When there is detectable pressure, controller 1418 activates hot air relay 1420. Hot air relay 1420 then activates hot air flow control valve 1434 and heat sensor 1426, and, in the case of a pulsed system, pulse control module 1422. The compressed air starts to flow into the heat tube(s) 1410. The heat sensor 1426 turns on the heater relay 1430. The heater relay 1430 turns on the heat tube(s) 1410. As air heats up, it continues to flow and enter the heating mass 1412. When the heating mass 1412 reaches a predetermined temperature, the fan control module 1432 starts the fan 1452. The fan 1452 pushes or pulls the air over the heating mass 1412 along the passage (air duct) 1427 and the heated air is sent into the building/structure through a vent, and into the feedback loop 1462. The feedback loop 1462 returns a portion of the heated air into the system. As the heat tube(s) 1410's temperature increases over a predetermined value, the heat sensor 1426 turns off the heater relay 1430, which turns off the heating source in the heat tube(s) 1410 until the heat tube(s) temperature decreases to a predetermined value. The heat sensor then turns the heating source in the heat tube(s) 1410 on again. The process continues until the room reaches the desired temperature and the thermostat 1416 signals controller 1418 to suspend operation.

C. Heating-Only System with Hot Vortex Tube Configuration

Figure 14C:
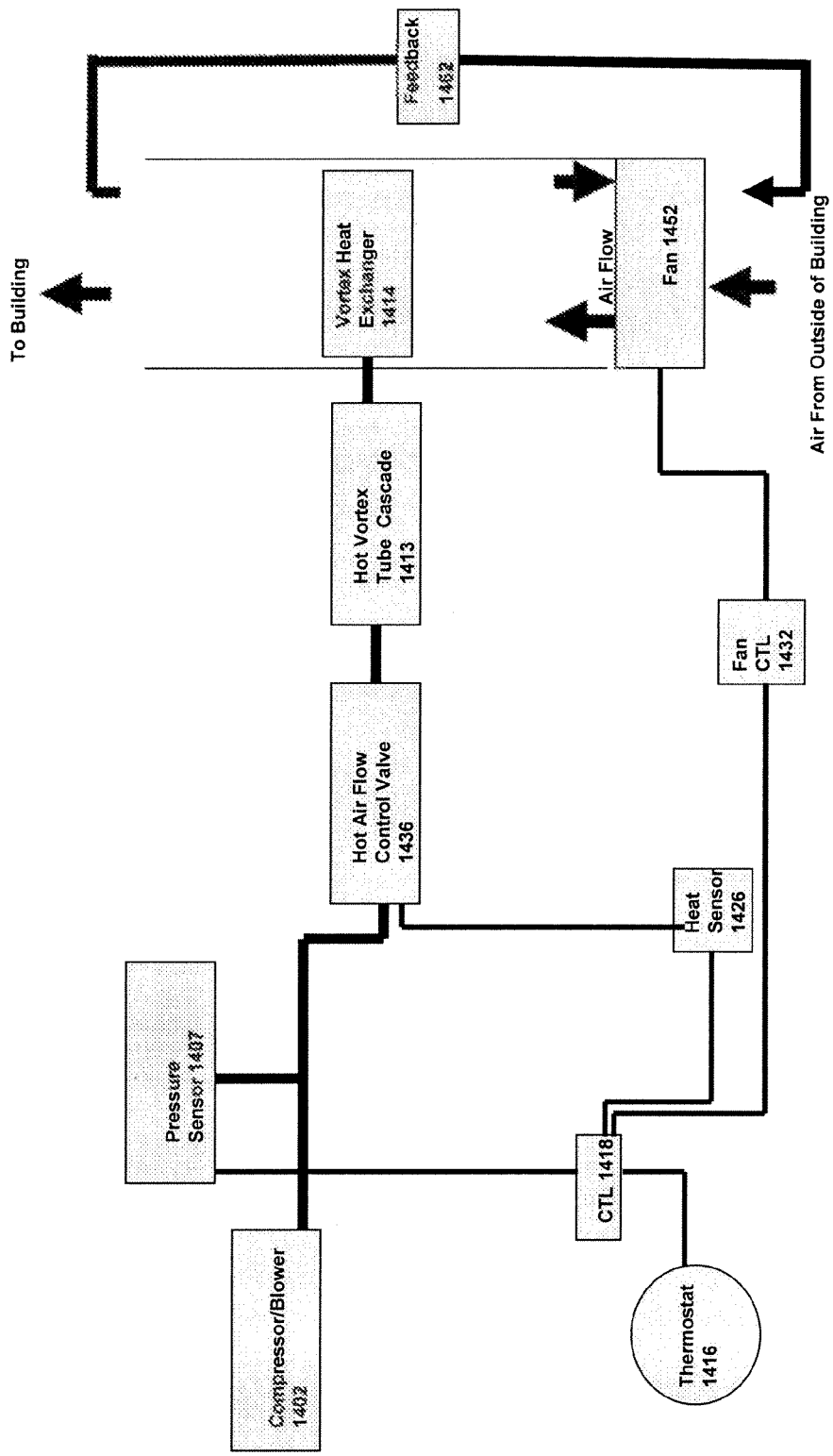

The configuration shown in FIG. 14C is intended for systems that produce hot air only such as heaters, ovens, dryers, fireplaces, and applications requiring temperatures not significantly high, for example, not higher than 200° C.

A thermostat 1416 activates the controller 1418, which tests the signal from the pressure sensor 1407. If there is no air pressure to the system, the system will not turn on. When there is detectable pressure, controller 1418 activates the heat sensor 1426. When the heat sensor 1426 is activated, the hot air flow control valve 1436 starts the airflow into the vortex tube cascades 1413. Though not shown here, there may be a hot air relay coupled to the hot air flow control valve 1436. The vortex tube cascades 1413 transfers heat to the vortex heat exchanger 1414. The fan 1452 pushes or pulls the air over the vortex heat exchanger 1414 and the heated air is sent into the structure/building and the feedback loop 1462. The feedback loop 1462 returns a portion of the heated air into the system. As the vortex tube cascades 1413's temperature exceeds a predetermined value, the heat sensor turns off the hot air flow control valve 1436, which turns off the air supply to the vortex tube cascades 1413 until the vortex tube cascades 1413's temperature decreases to a predetermined value. The heat sensor 1426 then turns the hot air flow control valve 1436 on again. The process continues until the building/structure reaches the desired temperature and the thermostat 1416 signals controller 118 to suspend operation.

D. Cooling-Only System with Cold Vortex Tube Configuration

Figure 14D:
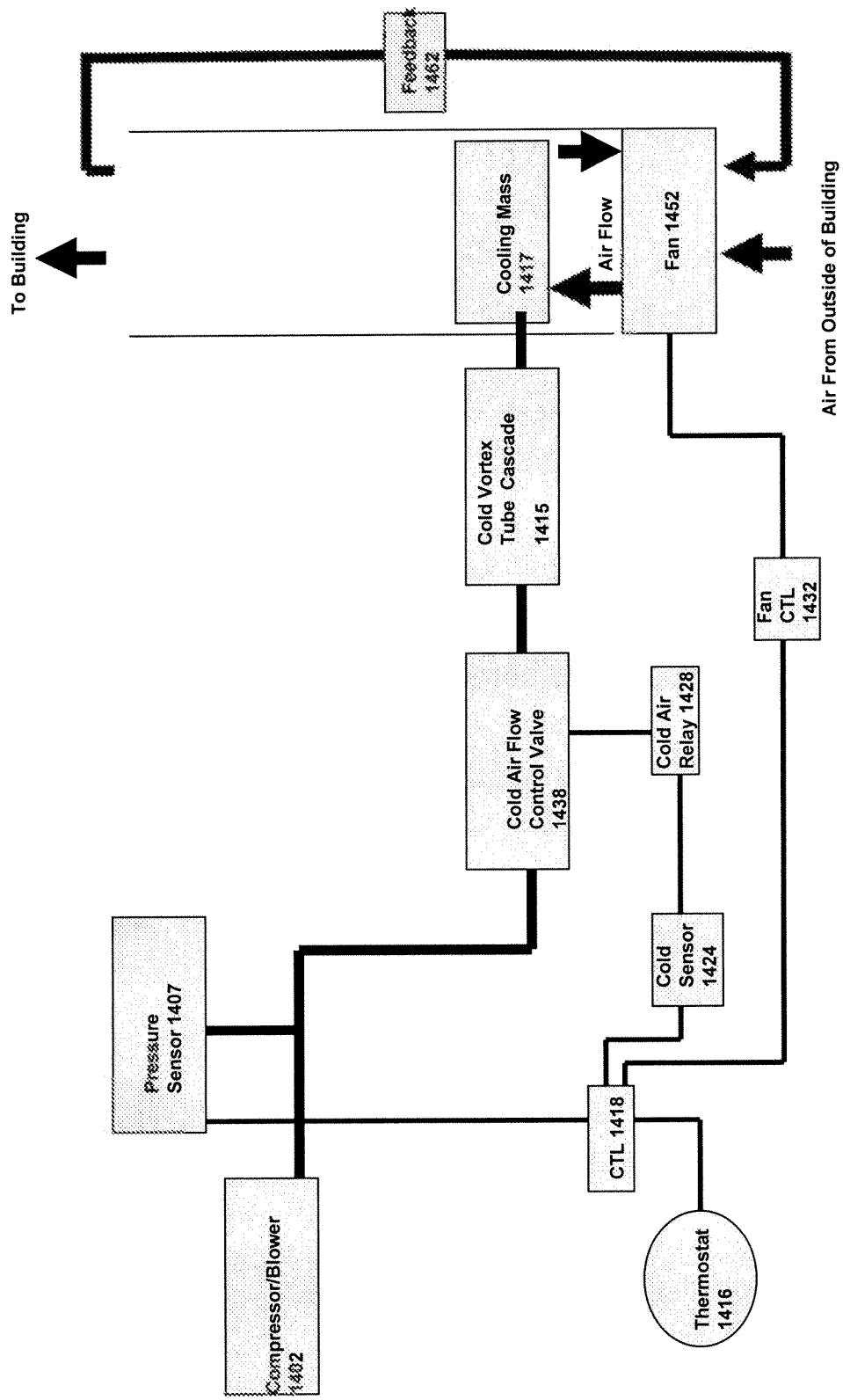

The configuration shown in FIG. 14D is intended for systems that need cold air only, such as coolers, refrigerators, freezers, and spot cooling. Any other applications that require cold air or cold water as described elsewhere in this document, can be accomplished with the cooling system with cold vortex tube configuration as described below.

A thermostat 1416 activates the controller 1418, which tests the signal from the pressure sensor 1407. If there is no air pressure to the system, the system will not turn on. When there is detectable pressure, controller 1418 activates the cold sensor 1424. The cold sensor 1424 then activates the cold air relay 1428. The cold air relay 1428 then activates the Cold air flow control valve 1438. The compressed air starts to flow into the cold vortex tube cascade 1415. As the air temperature decreases, it continues to flow and enter the cooling mass 1417. When the cooling mass 1417 reaches a predetermined temperature, the fan control module 1432 starts the fan 1452. The fan 1452 pushes or pulls the air over the cooling mass 1417 and the cooled air is sent into the structure/building and the feedback loop 1462. The feedback loop 1462 returns a portion of the cooled air into the system. As the cold vortex tube cascade 1415's temperature decreases to a predetermined value, the cold sensor 1424 turns off the cold air relay 1428, which turns off the cold airflow control valve 1438 until the cold vortex tube cascade 1415's temperature decreases to a predetermined value. The cold sensor 1424 then turns the cold air flow control valve 1438 on again. The process continues until the building/structure reaches the desired temperature and the thermostat 1416 signals controller 1418 to suspend operation.

E. Heating-Only System with Heat Tube and Hot Vortex Tube Configuration

Figure 14E:
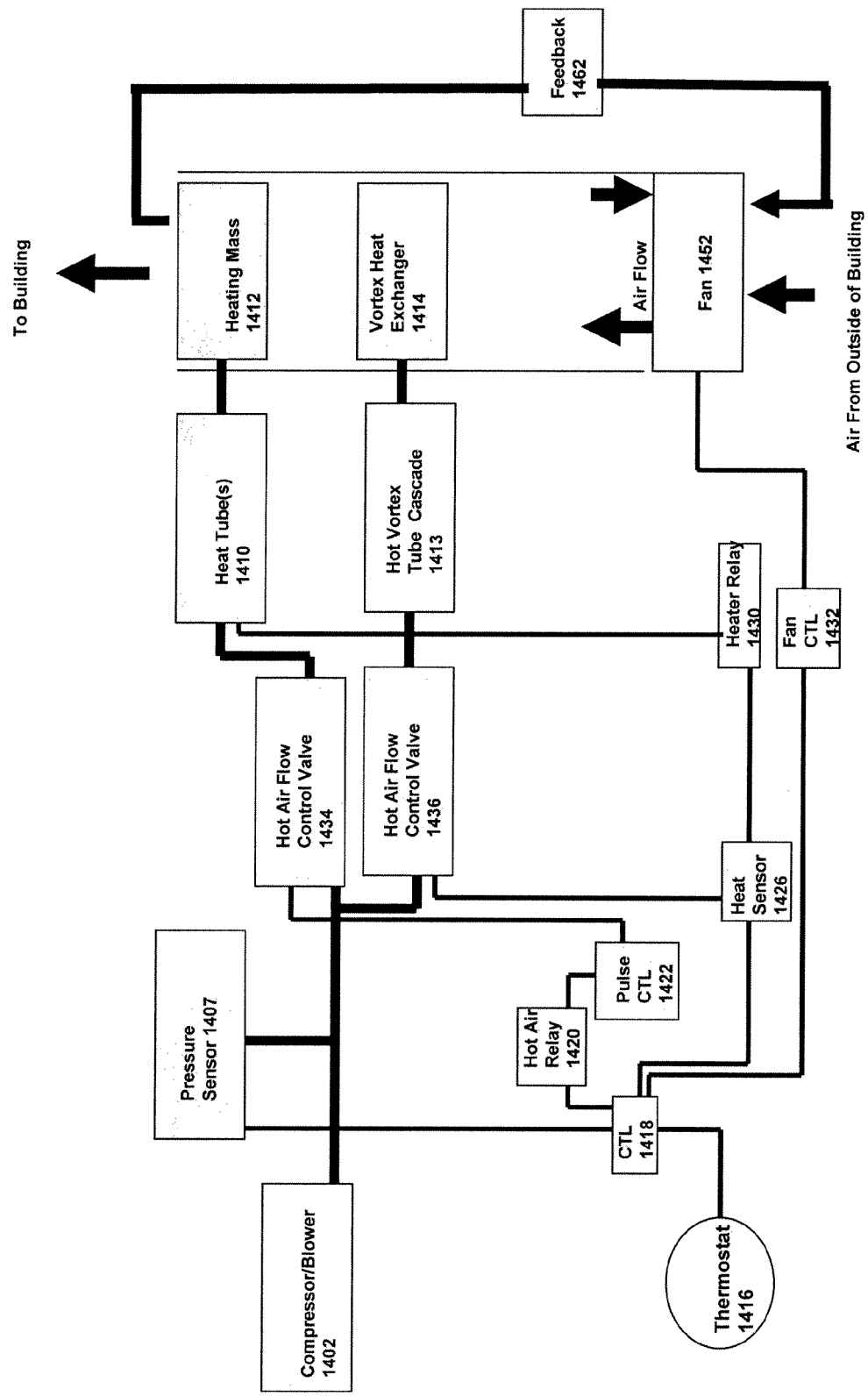

The configuration shown in FIG. 14E is intended for systems such that produce hot air only such as heaters, ovens, dryers, fireplaces and applications requiring very high temperatures.

A thermostat 1416 activates the controller (CTL) 1418, which tests the signal from the pressure sensor 1407. If there is no air pressure to the system, the system will not turn on. When there is detectable pressure, controller 1418 activates hot air relay 1420. Hot air relay 1420 then activates hot air flow control valve 1434 and heat sensor 1426, and, in the case of a pulsed system, pulse control module 1422. The compressed air starts to flow into the heat tube(s) 1410. The heat sensor 1426 turns on the heater relay 1430. The heater relay 1430 turns on the heat tube(s) 1410. As air heats up, it continues to flow and enter the heating mass 1412. When the heating mass 1412 reaches a predetermined temperature, the fan control module 1432 starts the fan 1452. The fan 1452 pushes or pulls the air over the heating mass 1412 along the passage (air duct) 1427 and the heated air is sent into the building/structure through a vent, and into the feedback loop 1462. The feedback loop 1462 returns a portion of the heated air into the system. As the heat tube(s) 1410's temperature increases over a predetermined value, the heat sensor 1426 turns off the heater relay 1430, which turns off the heating source in the heat tube(s) 1410 until the heat tube(s) temperature decreases to a predetermined value. The heat sensor then turns the heating source in the heat tube(s) 1410 on again. The process continues until the room reaches the desired temperature and the thermostat 1416 signals controller 1418 to suspend operation.

One or more vortex tube cascades 1413 are also added to this system configuration as an additional heating device in concert with heat tube(s) 1410. Vortex tubes may not require electricity to operate, but the heating action may be enhanced by using a thermoelectric circuit. An example vortex tube can generate a hot air flow having a temperature of 110° C. and can add 326 kJ or 309.2 BTU of energy to the heating effort of the system. The vortex tube cascade 1413 is also controlled in the same way as heat tube(s) 1410 with the exception that they do not require a pulse control module 1422. The cooled air produced as a byproduct of vortex tube cascade 1413's operation may be routed to a cooling system or simply exhausted out. When the heat sensor 1426 is activated, the hot air flow control valve 1436 starts the airflow into the vortex tube cascades 1413. Though not shown here, there may be a hot air relay coupled to the hot air flow control valve 1436. The vortex tube cascades 1413 transfer heat to the vortex heat exchanger 1414. The fan 1452 pushes or pulls the air over the vortex heat exchanger 1414 and the heated air is sent into the building/structure and to the feedback loop 1462. The feedback loop 1462 returns a portion of the heated air into the system. As the vortex tube cascades 1414's temperature exceeds a predetermined value, the heat sensor 1426 turns off the hot air flow control valve 1436, which turns off the operation of the vortex tube cascades 1413 until the vortex tube cascades 1413's temperature decreases to a predetermined value. The heat sensor 1426 then turns the hot air flow control valve 1436 on again. The process continues until the structure/building reaches the desired ambient temperature and the thermostat 1416 signals controller 1418 to suspend operation.

Figure 14F:
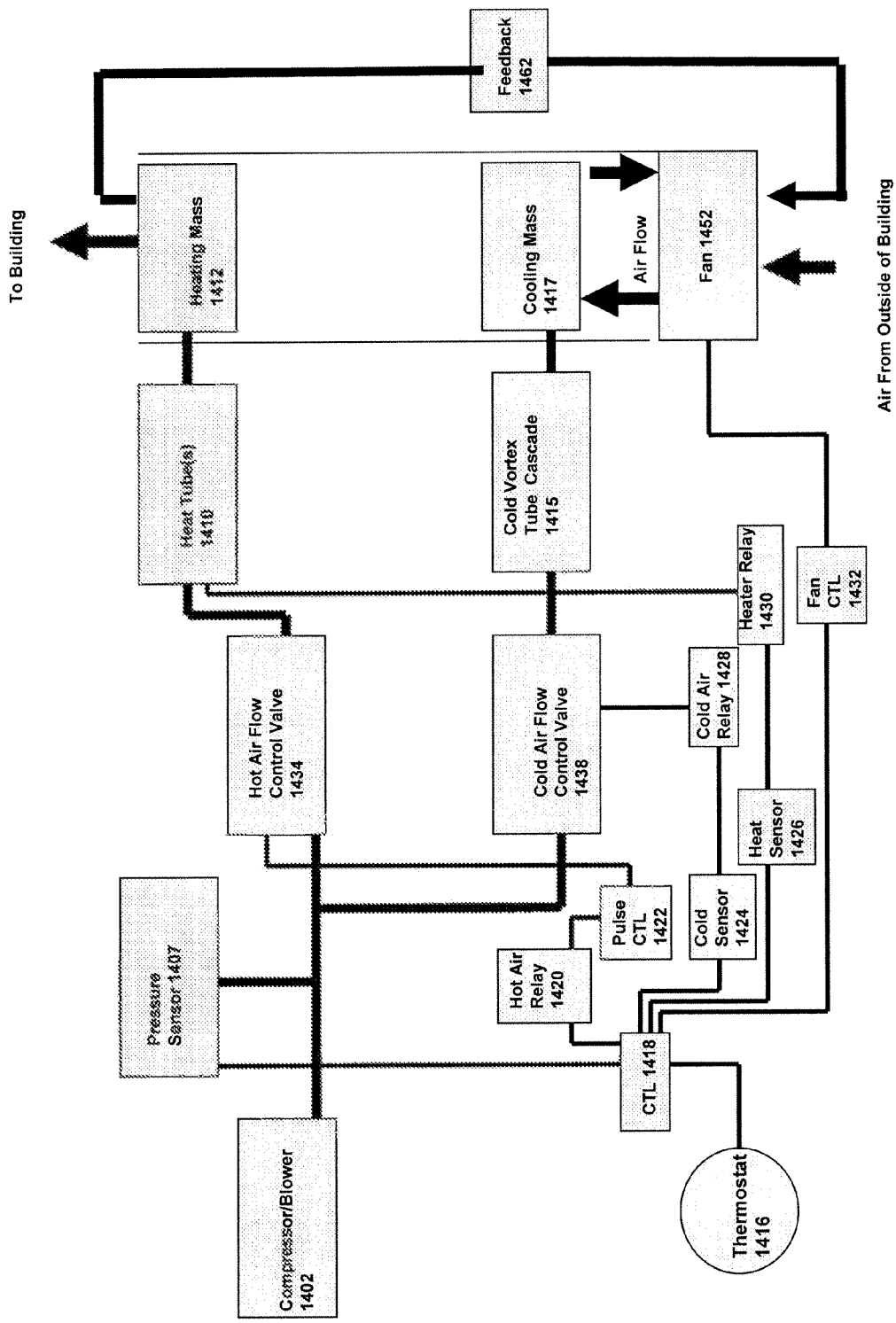

F. Hybrid Heating and Cooling System with Heating Tubes and Cold Vortex Tube Configuration The configuration shown in FIG. 14F is intended for systems such as HVAC, environmental chambers, combination HVAC/refrigeration systems, refrigerators, combination HVAC/boiler/refrigerator systems.

a) Heating Mode

A thermostat 1416 activates the controller (CTL) 1418, which tests the signal from the pressure sensor 1407. If there is no air pressure to the system, the system will not turn on. When there is detectable pressure, controller 1418 activates hot air relay 1420. Hot air relay 1420 then activates hot air flow control valve 1434 and heat sensor 1426, and, in the case of a pulsed system, pulse control module 1422. The compressed air starts to flow into the heat tube(s) 1410. The heat sensor 1426 turns on the heater relay 1430. The heater relay 1430 turns on the heat tube(s) 1410. As air heats up, it continues to flow and enter the heating mass 1412. When the heating mass 1412 reaches a predetermined temperature, the fan control module 1432 starts the fan 1452. The fan 1452 pushes or pulls the air over the heating mass 1412 along the passage (air duct) 1427 and the heated air is sent into the building/structure through a vent, and into the feedback loop 1462. The feedback loop 1462 returns a portion of the heated air into the system. As the heat tube(s) 1410's temperature increases over a predetermined value, the heat sensor 1426 turns off the heater relay 1430, which turns off the heating source in the heat tube(s) 1410 until the heat tube(s) temperature decreases to a predetermined value. The heat sensor then turns the heating source in the heat tube(s) 1410 on again. The process continues until the room reaches the desired temperature and the thermostat 1416 signals controller 1418 to suspend operation.

b) Cooling Mode

A thermostat 1416 activates the controller 1418, which tests the signal from the pressure sensor 1407. If there is no air pressure to the system, the system will not turn on. When there is detectable pressure, controller 1418 activates the cold sensor 1424. The cold sensor 1424 then activates the cold air relay 1428. The cold air relay 1428 then activates the Cold air flow control valve 1438. The compressed air starts to flow into the cold vortex tube cascade 1415. As the air temperature decreases, it continues to flow and enter the cooling mass 1417. When the cooling mass 1417 reaches a predetermined temperature, the fan control module 1432 starts the fan 1452. The fan 1452 pushes or pulls the air over the cooling mass 1417 and the cooled air is sent into the structure/building and the feedback loop 1462. The feedback loop 1462 returns a portion of the cooled air into the system. As the cold vortex tube cascade 1415's temperature decreases to a predetermined value, the cold sensor 1424 turns off the cold air relay 1428, which turns off the cold airflow control valve 1438 until the cold vortex tube cascade 1415's temperature decreases to a predetermined value. The cold sensor 1424 then turns the cold air flow control valve 1438 on again. The process continues until the building/structure reaches the desired temperature and the thermostat 1416 signals controller 1418 to suspend operation.

G. Combined Heating and Cooling with Vortex Tube Configuration

Figure 14G:
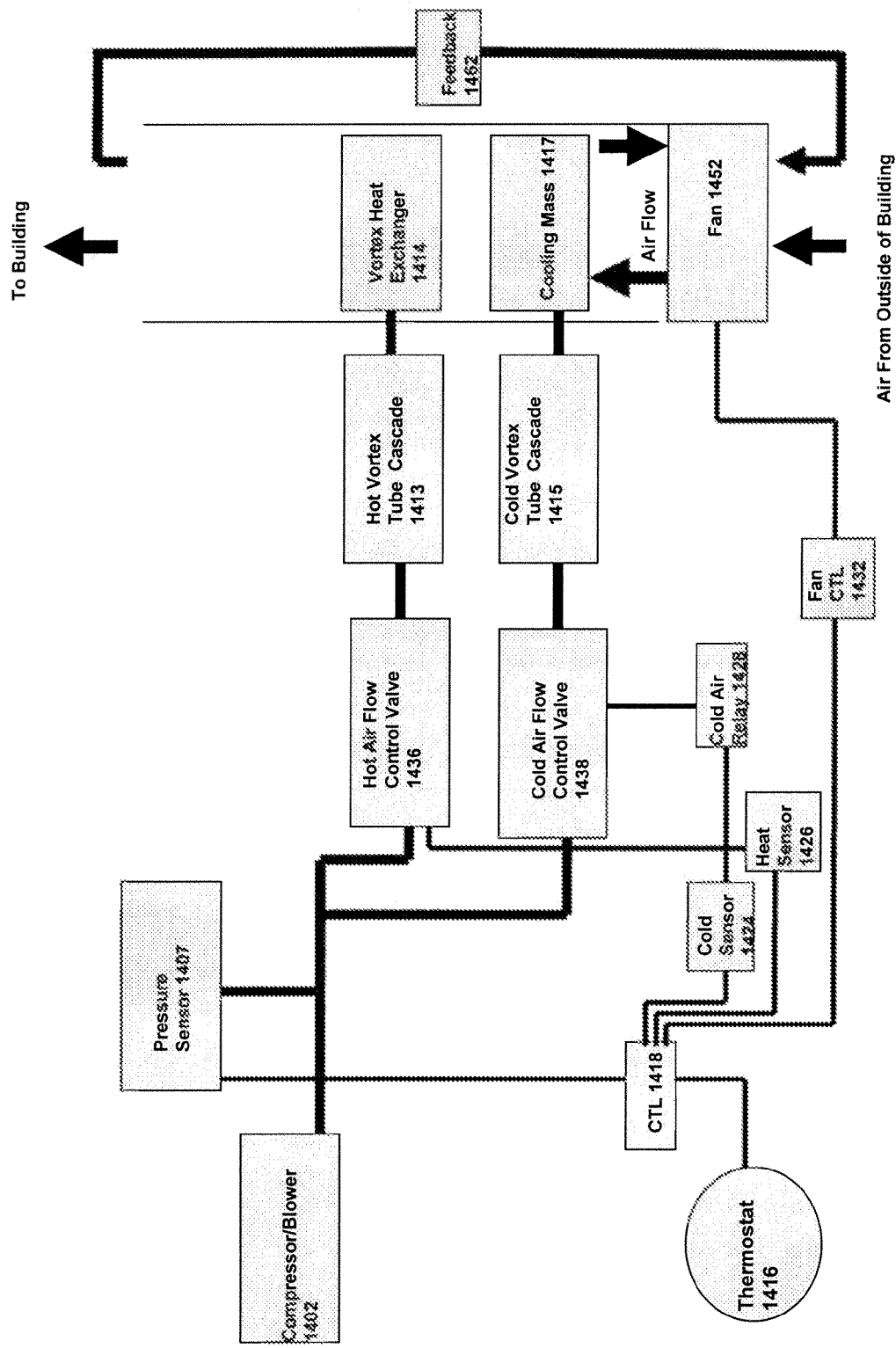

The configuration shown in FIG. 14G is intended for systems such as HVAC, environmental chambers, combination HVAC/refrigeration systems, refrigerators, combination HVAC/boiler/refrigerator systems.

a) Heating Mode

One or more vortex tube cascades 1413 are included to this system configuration as the heating device. Vortex tubes may not require electricity to operate, but the heating action may be enhanced by using a thermoelectric circuit. An example vortex tube can generate a hot air flow having a temperature of 110° C. and can add 326 kJ or 309.2 BTU of energy to the heating effort of the system. The vortex tube cascade 1413 is also controlled in the same way as heat tube(s) 1410 with the exception that they do not require a pulse control module 1422. The cooled air produced as a byproduct of vortex tube cascade 1413's operation may be routed to a cooling system or simply exhausted out. When the heat sensor 1426 is activated, the hot air flow control valve 1436 starts the airflow into the vortex tube cascades 1413. Though not shown here, there may be a hot air relay coupled to the hot air flow control valve 1436. The vortex tube cascades 1413 transfer heat to the vortex heat exchanger 1414. The fan 1452 pushes or pulls the air over the vortex heat exchanger 1414 and the heated air is sent into the building/structure and to the feedback loop 1462. The feedback loop 1462 returns a portion of the heated air into the system. As the vortex tube cascades 1414's temperature exceeds a predetermined value, the heat sensor 1426 turns off the hot air flow control valve 1436, which turns off the operation of the vortex tube cascades 1413 until the vortex tube cascades 1413's temperature decreases to a predetermined value. The heat sensor 1426 then turns the hot air flow control valve 1436 on again. The process continues until the structure/building reaches the desired ambient temperature and the thermostat 1416 signals controller 1418 to suspend operation.

b) Cooling Mode

A thermostat 1416 activates the controller 1418, which tests the signal from the pressure sensor 1407. If there is no air pressure to the system, the system will not turn on. When there is detectable pressure, controller 1418 activates the cold sensor 1424. The cold sensor 1424 then activates the cold air relay 1428. The cold air relay 1428 then activates the Cold air flow control valve 1438. The compressed air starts to flow into the cold vortex tube cascade 1415. As the air temperature decreases, it continues to flow and enter the cooling mass 1417. When the cooling mass 1417 reaches a predetermined temperature, the fan control module 1432 starts the fan 1452. The fan 1452 pushes or pulls the air over the cooling mass 1417 and the cooled air is sent into the structure/building and the feedback loop 1462. The feedback loop 1462 returns a portion of the cooled air into the system. As the cold vortex tube cascade 1415's temperature decreases to a predetermined value, the cold sensor 1424 turns off the cold air relay 1428, which turns off the cold airflow control valve 1438 until the cold vortex tube cascade 1415's temperature decreases to a predetermined value. The cold sensor 1424 then turns the cold air flow control valve 1438 on again. The process continues until the building/structure reaches the desired temperature and the thermostat 1416 signals controller 1418 to suspend operation.

Persons skilled in the art will appreciate that same vortex tube cascades may be used in the heating mode and the cooling mode rather than using dedicated vortex tube cascades for heating and cooling, as shown in FIG. 14G. An example of such a system has been described with reference to FIG. 12.

Example Applications of the Embodiments of the Invention

Applications of the embodiments of the present invention may be in various fields, including, but not limited to, residential, commercial, and industrial heating and/or cooling for indoor air temperature-conditioning (where systems may include humidity control and air purification devices), water temperature conditioning, refrigeration, cold storage, temperature control in small appliances (e.g., hair dryers, coffee makers, toasters, chiller etc.), temperature control in large appliances (e.g., ovens, washers, dryers, dishwashers, etc.), heating in home fireplaces, large surface area heating/cooling (e.g., floors, walls, ceilings, tabletops, bar counters, etc.), data center cooling, automotive heating and air conditioning, shipping container temperature control during transport and the like. Persons skilled in the art will appreciate that the embodiments of the invention may be used for certain outdoor applications as well, such as, climate control in a garden, in an atrium, in an open-air stadium, theater or playground etc.

It should be understood that processes and techniques described herein are not inherently related to any particular apparatus and may be implemented by any suitable combination of components. Moreover, other implementations of the invention will be apparent to those skilled in the art from consideration of the specification and practice of the invention disclosed herein. The present invention has been described in relation to particular examples, which are intended in all respects to be illustrative rather than restrictive. Those skilled in the art will appreciate that many different combinations of functional elements will be suitable for practicing the present invention. It is intended that the specification and examples be considered as exemplary only, with a true scope and spirit of the invention being indicated by the following claims.

The invention claimed is:

1. A system for controlling ambient air temperature of an enclosed living space, comprising:
    an electronic controller configured to receive a signal indicative of a current temperature of the living space, wherein, based on the received signal, the electronic controller determines whether the living space needs to be heated or cooled to reach a desired temperature;
    a source of compressed air;
    a temperature-conditioning module, comprising thermal energy controlling means coupled to a heat exchanger mass, wherein the thermal energy controlling means is configured to actively control a thermal energy of the compressed air, as dictated by the electronic controller, and the heat exchanger mass is configured to adjust the temperature of the compressed air to a desired value;
    a conduit for delivering the compressed air to the thermal energy controlling means;
    a valve coupled to the conduit for regulating a flow of the compressed air, as dictated by the electronic controller; and
    an outlet port at one end of the heat exchanger mass for releasing a flow of compressed air to be directed towards the living space.

2. The system of claim 1, wherein the system further comprises:
    an external flow entry duct for letting in and directing an external flow of air over the heat exchanger mass, wherein the external flow of air in the system is substantially larger than the compressed air flow; and
    an outlet duct for directing temperature-conditioned air into the living space, wherein the temperature-conditioned air comprises a mixture of the external flow of air after flowing over the heat exchanger mass, and a flow of air released from the outlet port of the heat exchanger mass.

3. The system of claim 2, wherein the system further comprises:
    a feedback duct for channeling a portion of the flow of the temperature-conditioned air to an internal thermal feedback loop; and
    a fan for adjusting the external flow of air over the heat exchanger mass based on a feedback received from the internal thermal feedback loop and based on a sensor monitoring a temperature of the heat exchanger mass, as dictated by the electronic controller.

4. The system of claim 2, wherein the external flow of air comprises non-recirculated fresh air from outside the living space, or a flow of re-circulated air from inside the living space.

5. The system of claim 1, wherein the source of compressed air takes in either non-recirculated fresh air from outside the living space, or re-circulated air from inside the living space as an input.

6. The system of claim 1, wherein the thermal energy controlling means comprises one or more heat tubes having a corresponding heater coupled therewith, wherein the one or more heat tubes are configured to sustain a pressure of the compressed air therein.

7. The system of claim 1, wherein the thermal energy controlling means comprises one of more vortex tubes.

8. The system of claim 1, wherein the thermal energy controlling means comprises one of more vortex tubes, and one or more heat tubes having a corresponding heater coupled therewith, wherein the one or more heat tubes are configured to sustain a pressure of the compressed air therein.

9. The system of claim 1, wherein the thermal energy controlling means comprises a plurality of stages, each stage being coupled to a corresponding heat exchanger mass or a shared heat exchanger mass.

10. The system of claim 9, wherein the plurality of stages are connected in series, in parallel, in a star configuration, in a polygonal configuration, or as a ring.

11. The system of claim 1, wherein the compressed air delivery conduit may comprise one or more branches, each branch delivering compressed fluid to a corresponding thermal energy controlling means.

12. The system of claim 1, wherein the heat exchanger mass comprises a thermally conductive tubular member of a predetermined mass, arranged in a predetermined manner to enhance thermal energy exchange between the air flowing inside the tubular member and external flow of air flowing over the tubular member.

13. The system of claim 1, wherein the source of compressed air comprises means for varying a degree of compression of air based on a signal received from the electronic controller.

14. The system of claim 1, wherein the valve is configured to deliver a continuous flow, a pulsed flow, or an oscillating flow of the compressed air.

15. The system of claim 1, wherein a pressure sensor is coupled with the conduit and communicates with the electronic controller.

16. The system of claim 1, further comprising means for selecting a particular temperature conditioning mode, wherein the temperature conditioning mode is selected from the following: a heating only mode, a cooling only mode, a heating and cooling mode, and an external air flow only mode.

17. A system for individually controlling ambient temperatures of a plurality of localized spaces, comprising:
- a central electronic controller configured to receive a plurality of signals, each signal indicative of a current temperature of a corresponding localized space, wherein, based on a respective received signal, the central electronic controller determines whether the corresponding localized space needs to be heated or cooled to reach a desired local temperature;
- a source of compressed air;
- a plurality of local temperature-conditioning modules, each local temperature conditioning module comprising local thermal energy controlling means coupled to a local heat exchanger mass, wherein the local thermal energy controlling means is configured to actively control a thermal energy of the compressed air delivered locally, as dictated by the central electronic controller, and the local heat exchanger mass is configured to adjust the temperature of the compressed air to a desired local value;
- a plurality of local conduits branching out from a main conduit for delivering a portion of compressed air to the corresponding local thermal energy controlling means, wherein each local conduit is fitted with a valve for regulating a local flow of the compressed air, as dictated by the central electronic controller; and
- a plurality of local outlet ports, each local outlet port directing a local flow of temperature-conditioned air into the localized space, the temperature-conditioned air comprising air encompassing the localized space that flows over the local heat exchanger mass and compressed air released at an end of the local heat exchanger mass.

18. The system of claim 17, wherein the system further comprises:
- a plurality of local internal feedback ducts, each local feedback duct channeling a portion of the local flow of the temperature-conditioned air to a local internal thermal feedback loop corresponding to the localized space; and
- a plurality of fans, each fan adjusting the local flow of air over the local heat exchanger mass based on a feedback received from the local internal thermal feedback loop, and based on a sensor monitoring a temperature of the local heat exchanger mass, as dictated by the central electronic controller.

19. The system of claim 17, wherein the central electronic controller is operationally coupled to individual local components of the system via wired or wireless connection.

20. The system of claim 17, wherein a first localized space and a second localized space physically isolated from each other.

21. A system for controlling a temperature of an enclosed space included in an apparatus, comprising:
- an electronic controller configured to receive a signal indicative of a current temperature of the enclosed space, wherein, based on the received signal, the electronic controller determines whether the enclosed space needs to be heated or cooled to reach a desired temperature;
- a source of a compressed fluid;
- a temperature-conditioning module, comprising thermal energy controlling means coupled to a heat exchanger mass, wherein the thermal energy controlling means is configured to actively control a thermal energy of the compressed fluid, as dictated by the electronic controller, and the heat exchanger mass is configured to adjust the temperature of the compressed fluid to a desired value;
- a conduit for delivering the compressed fluid to the thermal energy controlling means;
- a valve coupled to the conduit for regulating a flow of the compressed fluid, as dictated by the electronic controller; and
- an outlet port at one end of the heat exchanger mass for releasing a flow of compressed fluid to be directed towards the enclosed space.

22. The system of claim 21, wherein the system further comprises:
- a fan for adjusting an external flow of a second fluid over the heat exchanger mass based on a sensor monitoring a temperature of the heat exchanger mass, as dictated by the electronic controller.

23. The system of claim 22, wherein the second fluid is re-circulated from within the enclosed space or introduced into the enclosed space.

24. The system of claim 22, wherein the second fluid and the compressed fluid are compatible to each other.

25. The system of claim 22, wherein the second fluid and the compressed fluid comprise the same material.

26. The system of claim 21, wherein the thermal energy controlling means comprises one or more heating tubes having a corresponding heater coupled therewith, wherein the one or more heating tubes are configured to sustain a pressure of the compressed fluid therein.

27. The system of claim 21, wherein the thermal energy controlling means comprises one of more vortex tubes.

28. The system of claim 21, wherein the thermal energy controlling means comprises one of more vortex tubes, and one or more heating tubes having a corresponding heater coupled therewith, wherein the one or more heating tubes are configured to sustain a pressure of the compressed fluid therein.

29. The system of claim 21, wherein the thermal energy controlling means comprises a plurality of stages, each stage being coupled to a corresponding heat exchanger mass or a shared heat exchanger mass.

30. The system of claim 29, wherein the plurality of stages are connected in series, in parallel, in a star configuration, in a polygonal configuration, or as a ring.

31. The system of claim 21, wherein the compressed fluid delivery conduit may comprise one or more branches, each branch delivering compressed fluid to a corresponding thermal energy controlling means.

32. The system of claim 22, wherein the heat exchanger mass comprises a thermally conductive tubular member of a predetermined mass, arranged in a predetermined manner to enhance thermal energy exchange between the fluid flowing inside the tubular member and the second fluid flowing over the tubular member.

33. The system of claim 21, wherein the source of compressed fluid comprises means for varying a degree of compression of fluid based on a signal received from the electronic controller.

34. The system of claim 21, wherein the valve is configured to deliver a continuous flow, a pulsed flow, or an oscillating flow of the compressed fluid.

35. The system of claim 21, wherein the compressed fluid is compressed air.

36. The system of claim 1, wherein the compressed fluid drives a turbine that generates electricity.

* * * * *